Inventors
DONALD S. REYNOLDS
HARVEY R. KRUEGER

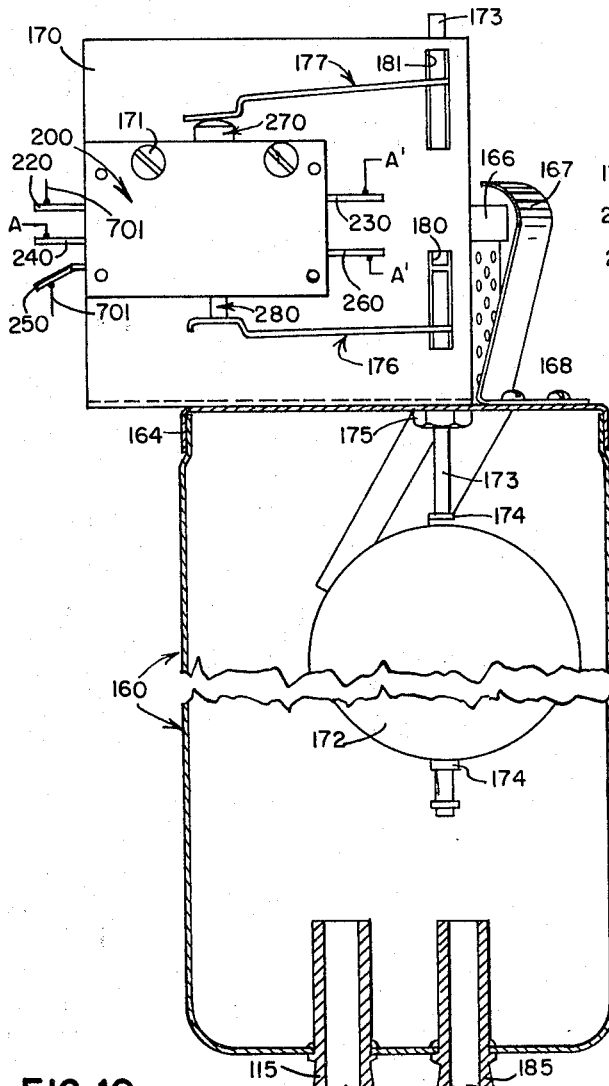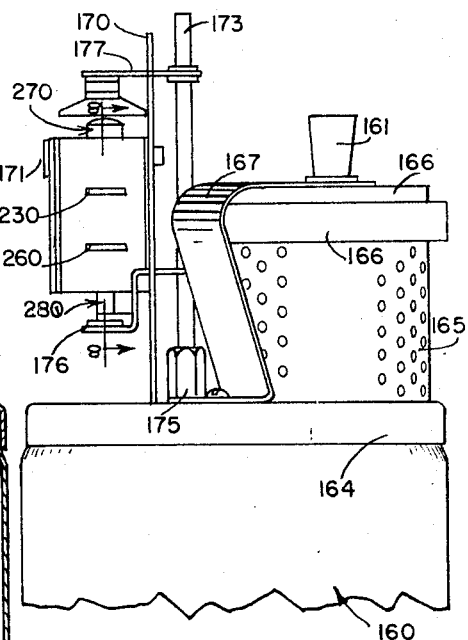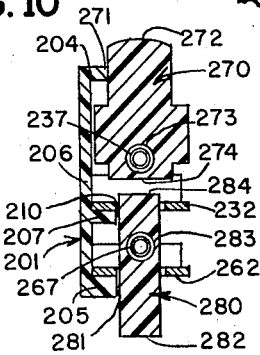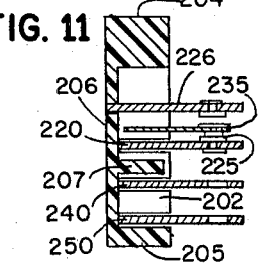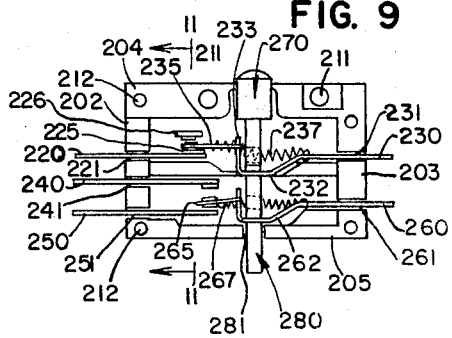

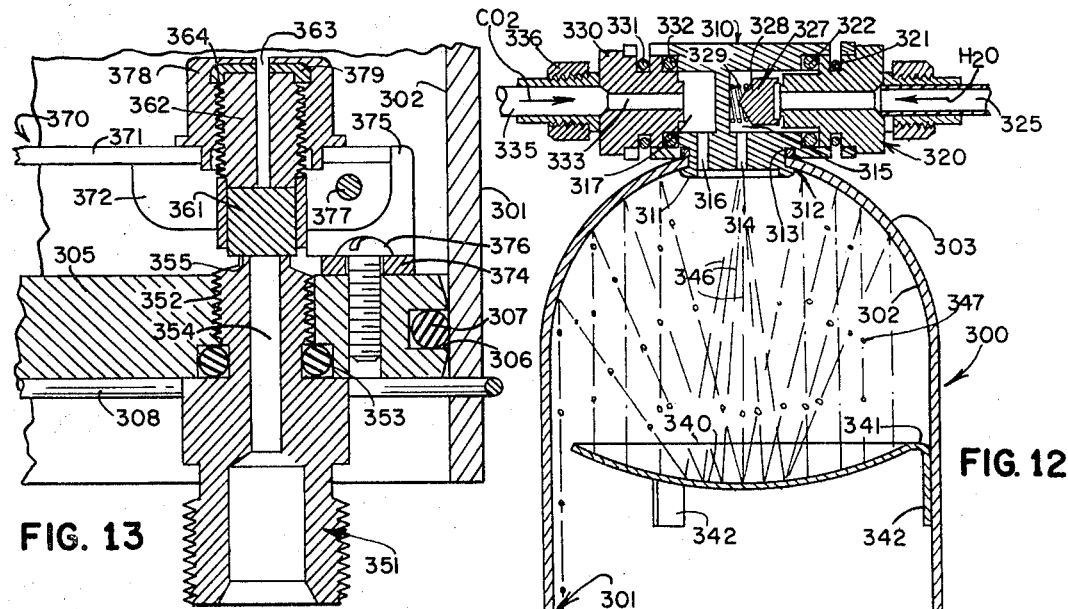
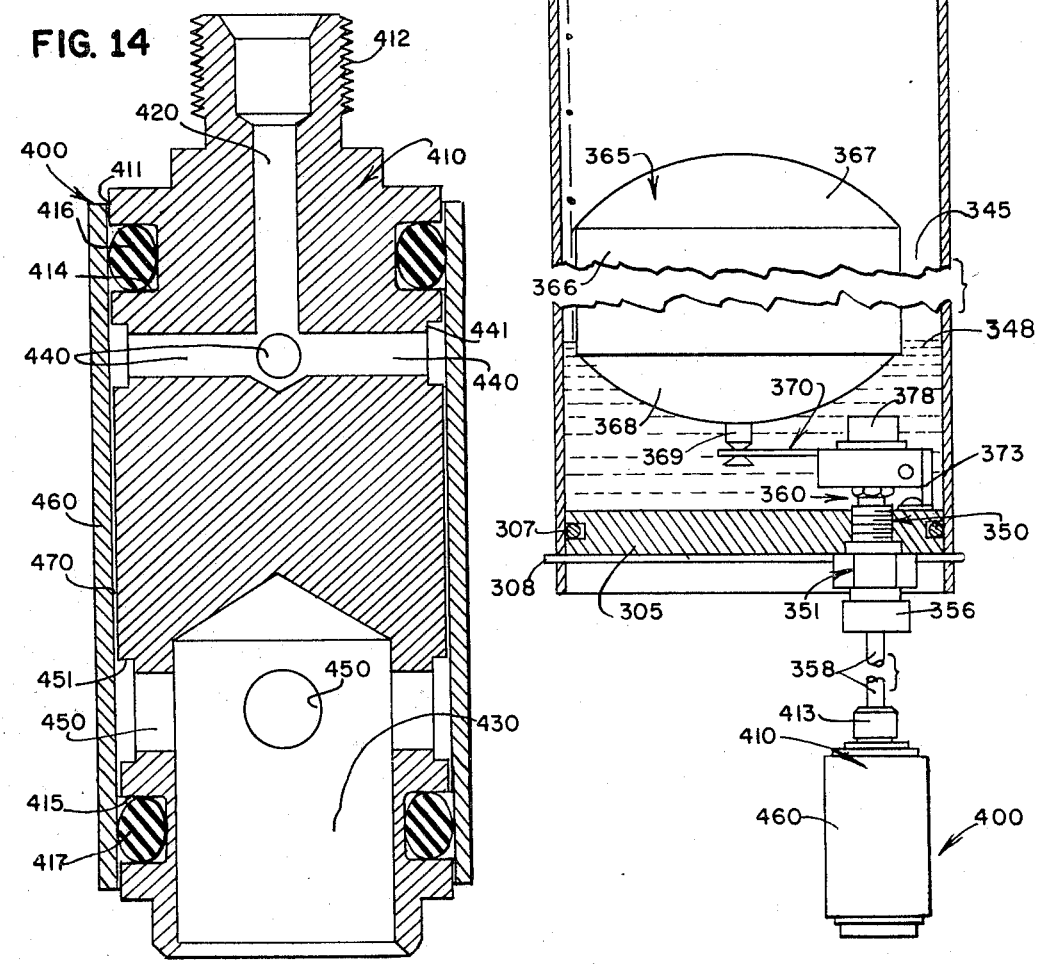

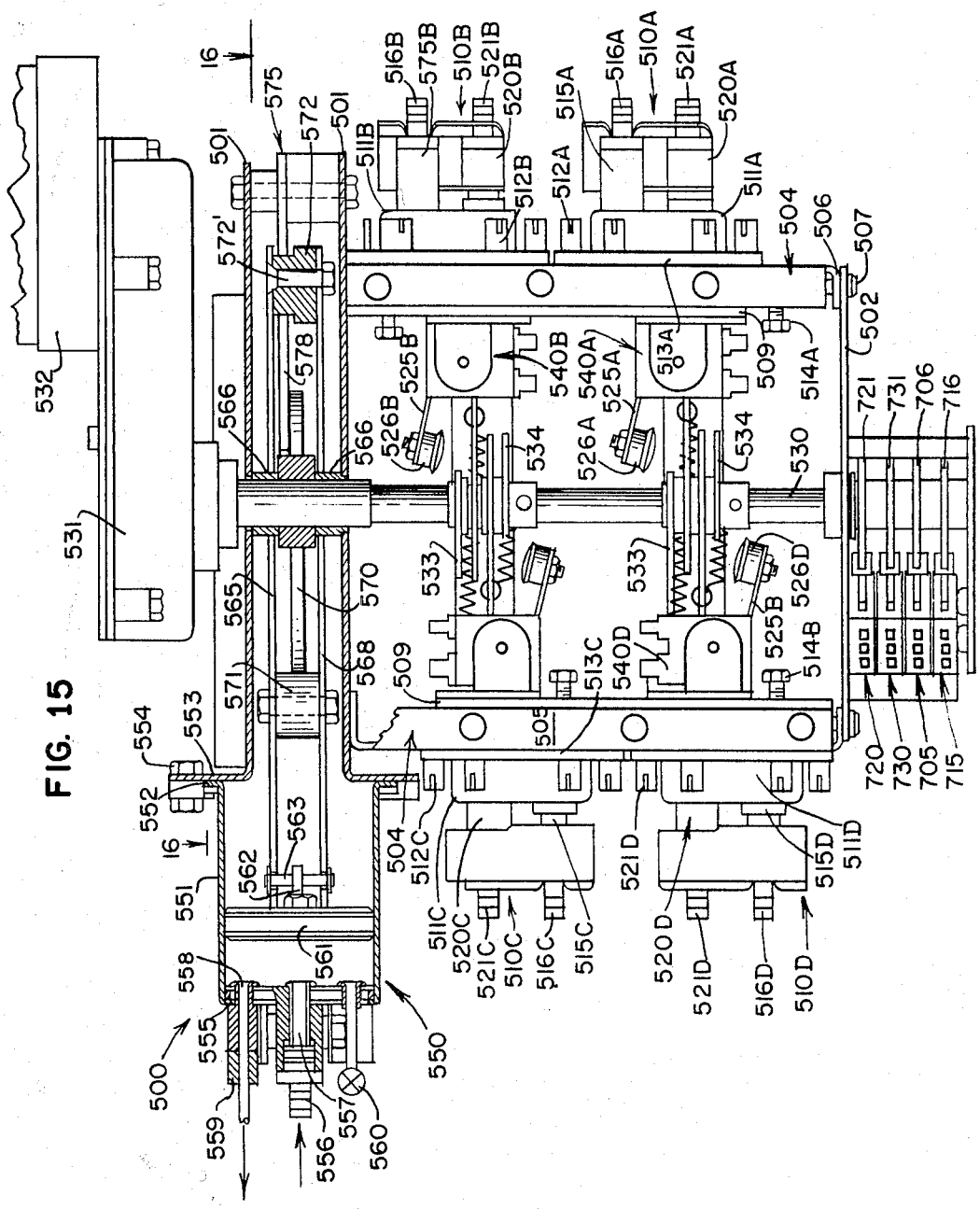

United States Patent Office 3,441,176
Patented Apr. 29, 1969

3,441,176
BEVERAGE DISPENSING MACHINE
Donald S. Reynolds, Glencoe, and Harvey R. Krueger, Carpentersville, Ill., assignors to Reynolds Products, Inc., Rolling Meadows, Ill., a corporation of Illinois
Continuation-in-part of application Ser. No. 541,465, Mar. 31, 1966. This application Sept. 18, 1967, Ser. No. 668,419
Int. Cl. B67d 5/08; Q04c 23/38; 567d 5/56
U.S. Cl. 222—70                                  23 Claims

ABSTRACT OF THE DISCLOSURE

In a beverage dispensing machine, the combination comprising a housing having a dispensing station thereon for accommodating a container for a beverage, a cooling coil in the housing for cooling water passing therethrough and having an inlet and an outlet, a water pump in the housing and having an inlet connected to a source of water and an outlet connected to the inlet of the cooling coil, the water pump being operative to establish a first predetermined pressure at the cooling coil outlet, a fluid-tight vessel disposed in the housing and defining a carbonating chamber, a first inlet in the vessel for admitting water under pressure to the carbonating chamber and a second inlet in the vessel for admitting gas under pressure to the carbonating chamber, a source of carbonating gas for supplying carbonating gas to the second vessel inlet, an outlet in the vessel for delivering carbonated water from the carbonating chamber, a dispensing valve having an outlet at the dispensing station for discharging cooled non-carbonated water at the dispensing station, a first conduit connecting the cooling coil outlet and the first vessel inlet for passing cooled water from the cooling coil into the carbonating chamber, a second conduit connecting the cooling coil and the dispensing valve, a normally closed check valve disposed in the first conduit, the check valve being operable to admit water under pressure into the carbonating chamber when the pressure of the water thereagainst is at a second predetermined pressure less than the first predetermined pressure, a third conduit having one end connected to the vessel outlet and the other end thereof at the dispensing station, and control mechanism selectively operable to cause operation of the water pump and to maintain the dispensing valve closed whereby operation of the pump causes water to flow through the cooling coil and to the outlet thereof at a pressure greater than the second predetermined pressure so as to effect flow through the first conduit and to effect opening of the check valve for passage therethrough of cooled water into the carbonating chamber and thence through the third conduit for discharge at the dispensing station, the control mechanism being selectively operable to cause operation of the water pump and to maintain the dispensing valve open whereby operation of the pump causes water to flow through the cooling coil and to the outlet thereof at a pressure lower than the second predetermined pressure so as to effect flow through the second conduit and the dispensing valve for passage therethrough of cooled water and for discharge at the dispensing station.

This application is a continuation-in-part of application Ser. No. 541,465, Reynolds et al., filed Mar. 31, 1966, for Beverage Dispensing Machine, now Patent No. 3,378,170, issued Apr. 16, 1968, and assigned to the same assignee as the present application.

This invention relates to beverage dispensing machines, and particularly to automatic manually operated beverage dispensing machines, and to improved components and control mechanism therefor.

There is disclosed herein an improved iced beverage dispensing machine that can produce a large variety of drinks including iced drinks and carbonated drinks when desired, which machine has small overall dimensions in relation to the capacity for producing drinks therefrom and which can produce substantially continuously at a high rate ice cubes possessing desirable characteristics and carbonated water possessing certain desirable characteristics.

It is a primary object of the present invention to provide a beverage dispensing machine of the type set forth which incorporates an improved system for dispensing carbonated water and non-carbonated water therefrom.

It is another object of the invention to provide, in a beverage dispensing machine of the type set forth, an improved instantaneous type carbonator for use in conjunction with the carbonated and non-carbonated water dispensing systems disclosed herein.

Still another object of the invention is to provide, in combination with the improved carbonated and non-carbonated water dispensing systems disclosed herein, an improved carbonated water dispensing nozzle which minimizes the amount of foaming of the carbonated water upon the dispensing thereof into a container.

Still another object of the invention is to provide in a beverage dispensing machine, a dynamic electrical braking circuit for positively stopping operation of the machine after a predetermined time has elapsed.

A further object of the invention is to provide an improved manually operated push button selector mechanism for use in a beverage dispensing machine of the type set forth.

Still another object of the invention is to provide a novel float operated electrical switch for use in an iced beverage dispensing machine of the type set forth, wherein the switch is effective to de-energize the beverage dispensing machine when the water supply therein reaches a dangerously low level, and wherein the switch, under normal conditions, is operative to control the admission of water to the machine from an outside source to maintain the water level in the machine between two predetermined points.

Further features of the invention pertain to the particular arrangement of the parts of the beverage dispensing machine and to the particular control mechanisms and control circuits utilized in connection therewith, whereby the above outlined and additional operating features are attained.

The invention, both as to its organization and method of operation, together with further objects and advantages thereof, will best be understood by reference to the following specification when taken with the accompanying drawings, in which:

FIG. 6 is an enlarged fragmentary view in vertical section of the water supply tank, the float, the control assembly and the improved switch forming a part of the present invention;

FIG. 7 is a fragmentary view of the supply tank and water inlet thereto, illustrating the operative relationship of the switch and the float assembly in greater detail;

FIG. 8 is a view in vertical section through the switch forming a part of the present invention taken along the line 8—8 of FIG. 7, and illustrating the contacts thereof in a first operative position;

FIG. 9 is a view similar to FIG. 8 but illustrating the contacts of the switch in a second operative position;

FIG. 10 is an enlarged view in vertical section through the switch taken along the line 10—10 of FIG. 8;

FIG. 11 is an enlarged view in vertical section through the switch taken along the line 11—11 of FIG. 9;

FIG. 12 is an enlarged view in vertical section with certain portions broken away through the improved carbonator forming a part of the present invention and also illustrating the improved dispensing nozzle of the present invention in conjunction therewith;

FIG. 13 is an enlarged view in vertical section with certain portions broke away of the carbonator illustrated in FIG. 12, illustrating some of the components thereof in greater detail;

FIG. 14 is an enlarged view in vertical section of the dispensing nozzle forming a part of the present invention;

FIG. 15 is an enlarged view in horizontal section through the water pump and also illustrating the syrup pumps and the drive and control mechanism therefor;

Figure 1:
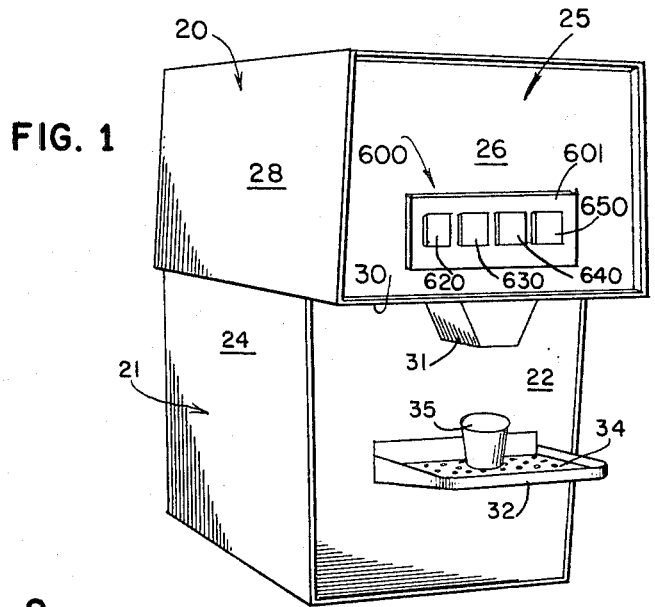
FIGURE 1 is a perspective view of the front of the improved beverage dispensing machine of the present invention.
Figure 2:
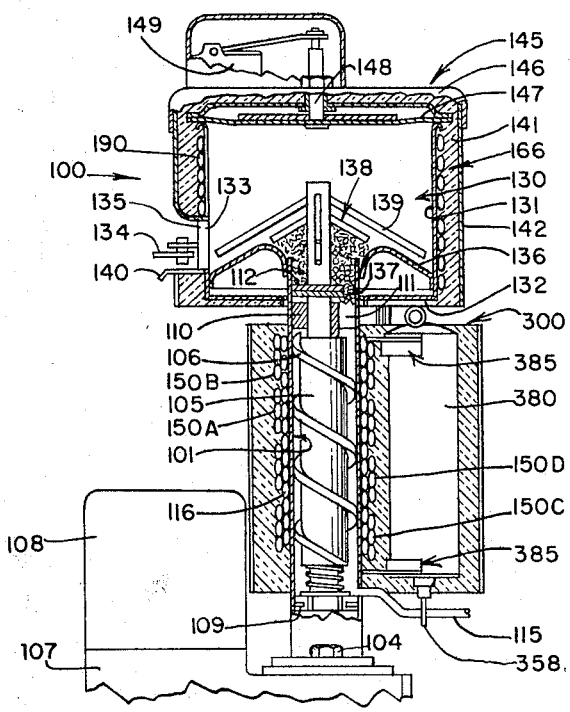
FIG. 2 is a view in vertical section through the auger type ice making apparatus forming a part of the machine of FIG. 1 and also showing the association therewith of the carbonator, all forming a part of the present invention.
Figure 4:
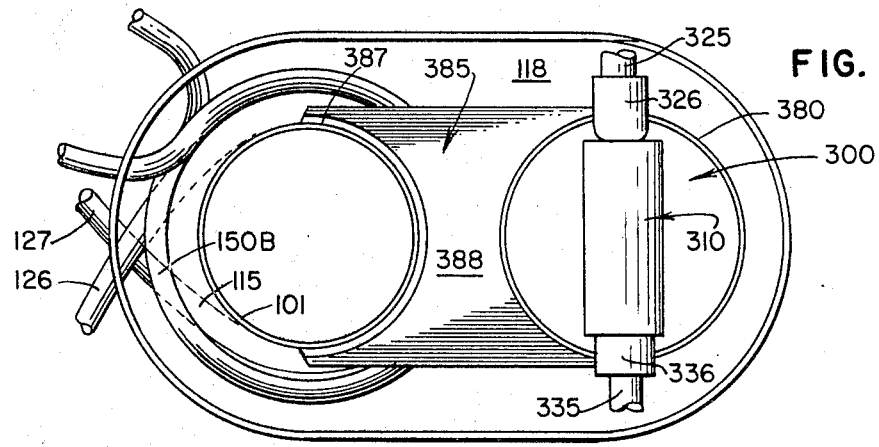
FIG. 4 is a top view of the assembly of FIG. 3, the auger having been removed from the ice cube making apparatus for the purpose of simplifying the illustration.

Referring first to FIG. 1 of the drawings, there is shown a perspective view of a beverage dispensing machine 20 made in accordance with and embodying the principles of the present invention. The machine 20 includes a lower housing 21 within which are disposed the ice making apparatus and the pumping apparatus, the lower housing 21 including a front wall 22, a pair of side walls 24 and a rear wall (not shown). Disposed above the lower housing 21 is an upper housing 25 including a front wall 26, a pair of side walls 28, a forwardly extending and overhanging bottom wall 30 and a rear wall (not shown). Extending downwardly from the bottom wall 30 and mounted on the front wall 22 is a fixture 31 defining a dispensing station against which may be placed a receptacle such as a paper cup 35 to receive the beverage to be dispensed, discharge openings (not shown) being provided immediately thereabove for still water, carbonated water, four different flavor syrups and ice cubes. Extending through the front wall 22 is a horizontal row of control buttons for operating the control mechanism, the assembly of buttons generally being designated by the numeral 600. Also mounted upon the front wall 22 is a drain tray 32 having a perforated screen 34 thereon communicating with a collecting area therebelow (not shown) provided with the drain connection (not shown) for discharge into any receptacle or drain for water and melt-down from ice upon the drain tray 32.

Disposed within the housings 21 and 25 is an ice cube making apparatus generally designated by the numeral 100, the construction and operation of the ice making apparatus 100 being best illustrated in FIGS. 2 to 4 and 19 of the drawings. A fundamental part of the ice making apparatus 100 is a vertically arranged tube 101 having an inner wall 102 defining a generally cylindrical upstanding freezing chamber and an outer wall 103, the lower end of the tube 101 being fixedly secured to an immovable part of the machine 20 by means of bolts 104. Disposed within the tube 101 and extending vertically therein is an auger 105 carrying thereon a spiral blade 106 extending from the lower end to the upper end thereof, the lower end of the auger 105 being connected to a gear reducer mechanism 107 driven by a motor 108 to cause rotation of the auger 105 within the tube 101. The lower end of the auger 105 has a water tight seal 109 disposed thereabout to seal the lower end of the tube 101 and the upper end of the auger 105 is received ond supported in an extruding head 110, the extruding head 110 being fixedly secured within the tube 101 and having a plurality of ice compressing and ice shaping passages 111 therethrough. Disposed above and also carried by the auger 105 is an ice blocking member 112 which serves periodically and sequentially to block the ice passages 111 during the operation of the ice making apparatus 100. In order to make ice, water is admitted into the lower end of the tube 101 from a conduit 115 from a water supply tank 160 (FIG. 6) the water rising in the tube 101 and being frozen against the inner wall 102 thereof due to the cooling of the tube 101 by means of a refrigerant coil 116, the refrigerant coil 116 being tightly wrapped about the tube 101 and supported thereby and in good thermal contact therewith and being connected to a refrigerating system, the details of which will be described further hereinafter with respect to FIG. 21. Disposed about and surrounding the tube 101 and the parts thereon is a quantity of heat insulating material 117 such as urethane foam insulation, the insulation 117 being held in position by means of a jacket 118.

Figure 21:
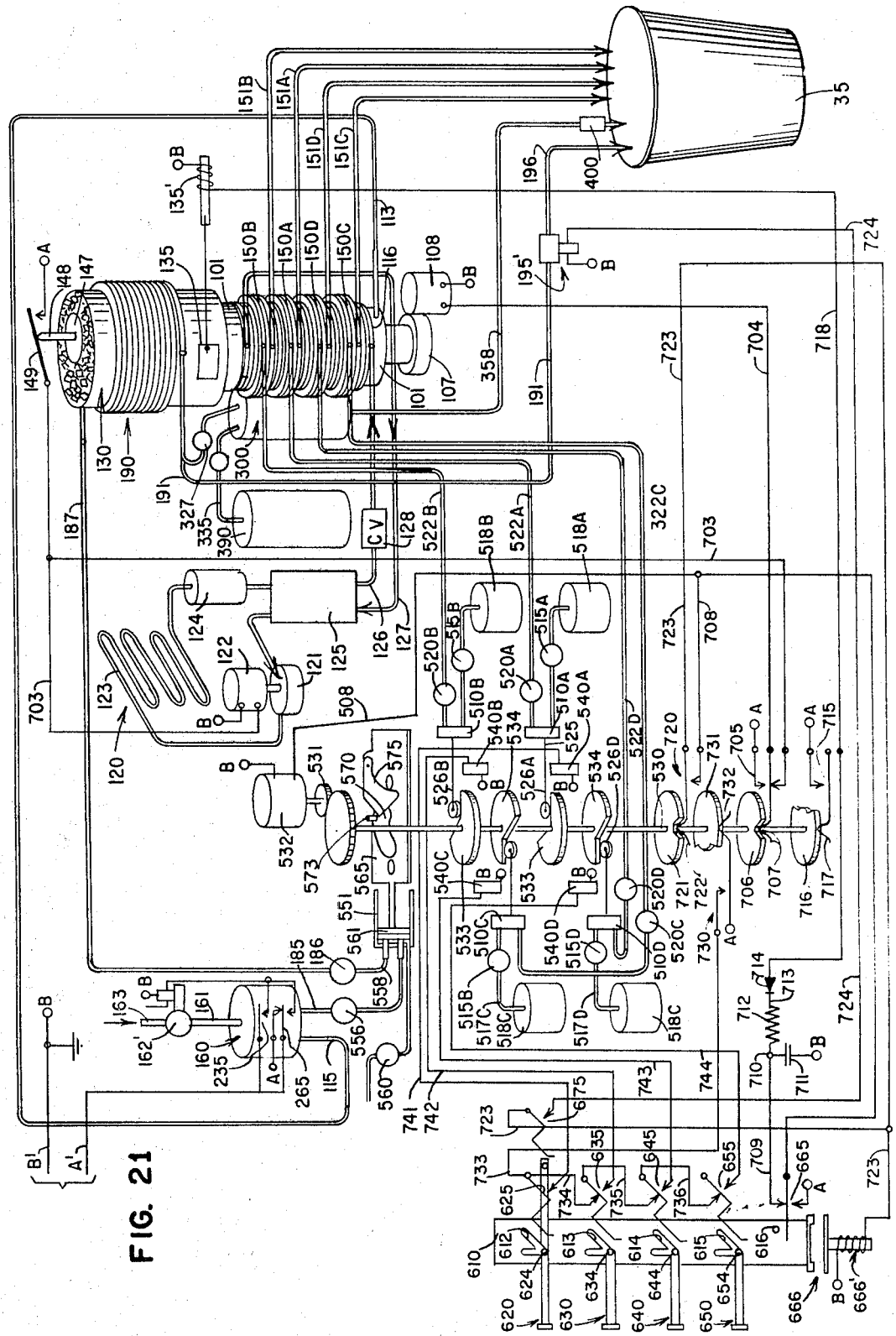
FIG. 21 is a schematic and diagrammatic view of a combined electrical, hydraulic and pneumatic circuit for the machine of FIG. 1.

Referring to FIG. 21 it will be seen that the refrigerant coil 116 is connected in circuit with a refrigeration system generally designated by the numeral 120 and including the usual compressor 121, a drive motor 122 therefor, a condenser 123, a dryer 124, and an accumulator 125 from which liquid refrigerant is fed along the line 126 via an expansion valve 128 to the input to the refrigerant coil 116 at the lower end thereof, the upper end of the refrigerant coil 116 being connected by a line 127 through the accumulator from whence the gaseous refrigerant is fed back to the compressor 121, all in a conventional manner.

In the operation of the ice cube making apparatus 100, water from the conduit 115 is frozen upon the inner wall 102 of the tube 101 due to the refrigeration thereof by means of the refrigerant coil 116; the film of ice on the inner wall 102 is scraped therefrom by the blade 106 on the auger 105 and is fed upwardly and compressed and congealed in passing through the ice passages 111 in the extruding head 110, the ice blocking member 112 aiding in this regard to insure that the ice is fully compact and solidified, after which the member 112 breaks the compact rod of ice thus generated into individual hard and compact ice cubes. It is to be understood that when the term "cube" is used throughout this specification that a unitary mass or block of ice is meant. The term is not to be construed in its geometric sense and is merely used as a convenient nomenclature to distinguish the compact unitary ice mass produced by the apparatus 100 from the flaked ice or small pieces of ice of the prior art.

The ice cubes so produced are fed upwardly into a storage hopper 130 that is mounted above and generally concentric with the vertical axis of the auger 105. The hopper 130 includes an upstanding cylindrical side wall 131 having a diameter substantially greater than the diameter of the tube 101 and arranged substantially concentric therewith, the lower end of the side wall 131 joining an inwardly and slightly downwardly directed bottom wall 132 which slopes down and inwardly to the outer wall 103 of the tube 101 and is securely joined thereto in a water tight manner. Provided in the side wall 131 is an opening 133 normally closed by a door 135, the position of the door 135 being controlled by a linkage 134 and a solenoid to be described more fully hereinafter. In order to maintain the ice stored within the hopper 130 in a substantially dry conditon, a foraminous support wall 136 is provided adjacent to the bottom thereof, the support wall 136 sloping upwardly toward the center and being joined on the outer edge thereof to the inner surface of the side wall 131 and being joined on the inner edge thereof to the upper end of the tube 101, whereby any melt-down of ice stored upon the support wall 136 drops therethrough and falls upon the bottom wall 132 and is fed back to the interior of the tube 101 for refreezing via a series of openings 137 therein. Also disposed in the hopper 130 and immediately above the support wall 136 is a stirrer 138 including a plurality of arms 139, the stirrer 138 being operatively connected to the auger 105 for movement therewith. The stirrer 138 tends to stop the coalescing of the ice cubes within the storage hopper 139 during the melting thereof and also serves to push ice cubes outwardly through the opening 133 when the door 135 is in the open position, the ice cubes falling upon a delivery chute 140 that feeds the ice cubes to the dispensing station adjacent to the fixture 31.

There also is provided about the hopper 130 a suitable quantity of insulating material 141, the insulating material 141 being held in position by an outer casing 142. Closing the upper end of the storage hopper 130 is a cover 145 that includes a top wall 146 formed of plastic and overlying and presisng against the upper edge of the side wall 131 a flexible sealing diaphragm 147. The diaphragm 147 also carries thereon a plunger 148 for actuating a level control switch 149 mounted on the cover 145 and forming a part of the control circuit, all as will be described more fully hereinafter; suffice it to say that when the hopper 130 becomes full of ice cubes so that the diaphragm 147 and the plunger 148 are lifted upwardly, the switch 149 is actuated to stop production of additional ice cubes.

A further detailed description of the construction and operation of the above described ice cube making apparatus 100 including the construction and operation of the extruding head 110, the refrigerating system 120, the storage hopper 130 and the cover 145 can be had by reference to U.S. Letters Patent No. 3,196,628 granted July 17, 1965 to Donald S. Reynolds for Ice Making and Dispensing Machine, the apparatus 100 hereof being substantially identical with the construction disclosed and claimed therein.

Figure 3:
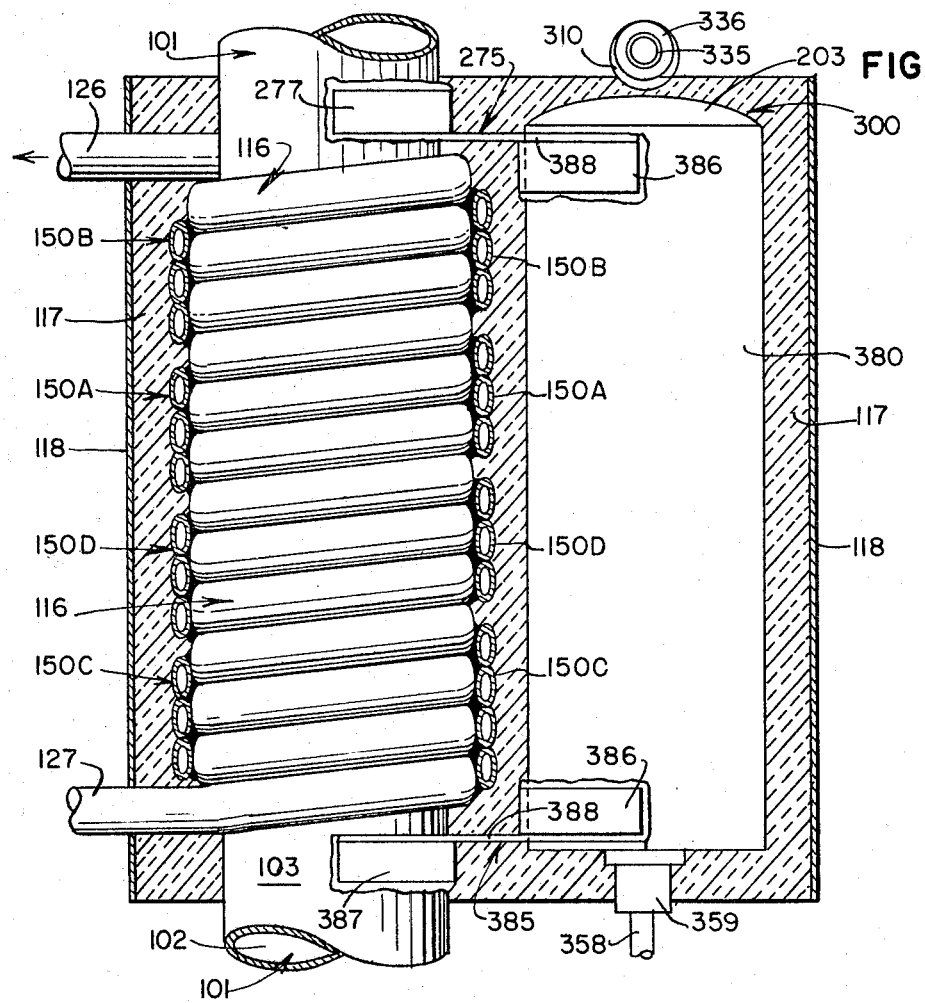
FIG. 3 is an enlarged view showing the construction of the tube forming a part of the ice making apparatus and defining the freezing chamber thereof, and also illustrating the mounting of the various refrigerant and syrup coils thereon and the carbonator associated therewith.

An important feature of the beverage dispensing machine disclosed herein resides in the fact that the refrigeration coils for the flavor syrups utilized in the machine 20 are cooled by the same refrigerating system 120 that freezes the water for the ice cube making apparatus 100. More specifically, in the machine 20 four syrup cooling coils are provided for a corresponding number of different flavor syrups, it being desirable substantially to cool the syrups before insertion thereof into the drink being formulated at the dispensing station 31. To this end four syrup cooling coils 150A, 150B, 150C and 150D have been provided about the refrigerant coil 116 and secured thereto and placed in good thermal contact therewith, see FIGS. 2 to 4 of the drawings. As is best seen in FIG. 3, each of the syrup coils 150A, 150B, 150C and 150D comprise essentially three turns about the refrigerant coil 116. This structure serves to cool the syrup within the coils to a temperature below 20 F., the preferred operating temperature being about 15° F.

Another important feature of the present invention resides in the provision of a water cooling coil 190 about the storage hopper 130, and specifically the vertical side wall 131, the water cooling coil 190 being wrapped around and supported by and in good thermal contact with the wall 131. As a consequence, the ice cubes within the hopper 130 in cooling the side wall 131 also cool the coil 190 and the water therein, whereby the cooling load for cooling the water in the coil 190 is also imposed upon the refrigerating system 120. As a consequence, it will be seen that the same refrigerating system 120 is used to produce the ice cubes in the ice cube making apparatus 100, to cool the flavor syrup in the flavor coils 150A, 150B, 150C and 150D, and finally to cool the water in the coil 190, the water in the coil 190 being used to supply both the carbonator 300 and to provide still or non-carbonated water to the dispensing station 31 and thence into the cup 35. The water in the coil 190 is cooled to a temperature below 40 F. and preferably down near the freezing point of 32° F.

Figure 19:
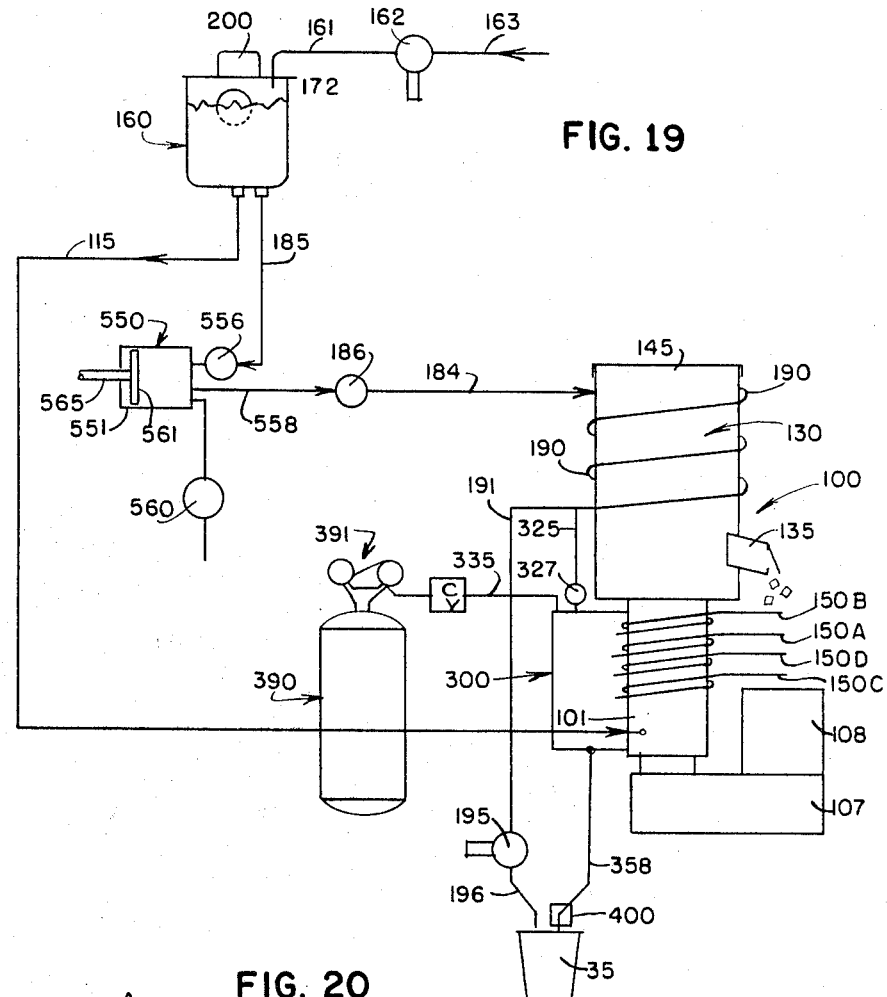
FIG. 19 is a schematic and diagrammatic view of the hydraulic system forming a part of the machine of FIG. 1.

Further details of the water supply system for the machine 20 are best illustrated in FIGS. 6, 7 and 19 of the drawings, wherein there is shown the water supply tank 160 having a water inlet 161 connected through a water inlet valve 162 to a source 163 such as the municipal water supply. The supply tank 160 includes a tank cover 164 which has an opening therethrough (not shown) through which water flowing from the inlet 161 is adapted to pass to the supply tank. An annular member 165 having a plurality of openings therein is positioned between the inlet 161 and the cover 164, which openings provide an air gap to prevent the water in the supply tank 160 from being siphoned back to the source of water in the event of a pressure failure therein. As best seen in FIG. 7, the inlet 161 is disposed in a cover 166 which overlies the upper end of the annular member 165. The cover 166 and the annular member 165 are firmly held in position on the tank cover 164 by way of a bracket 167, which bracket 167 is secured to the tank cover 164 by means of the screws 168.

A second bracket 170 is rigidly affixed to the tank cover 164, and, as shown in FIGS. 6 and 7, extends substantially normal thereto. The water supply tank is provided with a water level control switch, designated generally as 200, which switch forms part of the invention and is described in greater detail hereinafter. The switch 200 is mounted on the upstanding bracket 170 by means of the screws 171 passing therethrough and into suitably provided openings in the bracket 170. The switch 200 is operated by a float 172 which is disposed within the water tank 160. A float stem 173 passes through the float 172, the float 172 being securely positioned on the float stem 173 by a pair of nuts 174 disposed on opposite sides of the float. The upper end of the float stem 173 passes through a nut 175 which is disposed in the tank cover 164, the nut 175 having a smooth internal passage therethrough whereby the upper end of the float stem 173 is free to reciprocate in the vertical direction as the float 172 moves in response to changes in the water level in the tank 160.

As best seen in FIGS. 6 and 7, the float stem 173 is provided with a first laterally extending and generally L-shaped lower arm 176, and a second laterally extending and generally L-shaped upper arm 177, the arms 176 and 177 being disposed for cooperation with the switch 200 in a manner shortly to be described. The lower arm 176 passes through a first elongated opening 180 in the bracket 170. Similarly, the upper arm 177 passes through a second elongated opening 181 in the bracket 170. As best seen in FIG. 6, the openings 180 and 181 are elongated in the vertical direction and are positioned substantially adjacent to one edge of the bracket 170, whereby the arms 176 and 177 are free to reciprocate relative to the bracket 170 as the float 172 moves in response to changes in the level of the water contained in the supply tank 160. One outlet from the supply tank is connected to the supply line 115 for supplying water to the bottom of the ice cube making apparatus 100. A second outlet supplies water through a supply line 185 to a water pump for the machine 20, as described hereinafter.

The construction and operation of the switch 200 will now be described with special reference to FIGS. 8 through 11.

The switch 200 comprises a pair of mating members 201 formed of a molded phenolic composition, which members 201 define a housing including parallel first and second side walls 202 and 203 respectively, a top wall 204, a bottom wall 205, and a pair of end walls 206 which define a compartment within the housing 201. A molded partition 207 divides the compartment formed therein into upper and lower chambers 208 and 209 respectively, an opening 210 being provided in the partition 207 through which the upper and lower chambers 208 and 209 communicate. A pair of laterally extending openings 211 are provided in the housing 201 through which the screws 171 are adapted to pass so that the housing 201 can be mounted upon the bracket 170 as heretofore noted. Other lateral openings 212 are provided so that the mating members 201 comprising the housing may be fastened together.

A first terminal 220 extends through an opening 221 in the first side wall 202 of the housing and into the upper chamber 208. The first terminal 220 is provided with a first fixed electrical contact 225 at the inner end thereof. A second terminal 230 extends through an opening 231 the second side wall 203 and into the upper chamber 208. The inner end of the second terminal 230 is divided to provide a pair of split legs 232 which leave a free area over the opening 210 in the partition 207. The legs 232 terminate in upwardly extending portions 233 which are laterally spaced from the inner end of the first terminal 220 and are disposed substantially normal thereto. A first movable contact 235 is pivotally associated with the upstanding portions 233 of the second terminal 230 for pivotal movement into and out of engagement with the first fixed contact 225 of the first terminal 220. A first spring 237 extends between the second terminal 230 and the first movable contact 235 for normally biasing the first movable contact 235 out of engagement with the first fixed contact 225, as shown by the full lines in FIG. 8. A dummy contact 226 is provided in the upper chamber 208 to limit movement of the first movable contact 235 when it is in its normal position with respect to the first fixed contact 225.

A third terminal 240 extends through an opening 241 in the first side wall 202 and into the lower chamber 209, the third terminal 240 having a second fixed contact 245 disposed at the inner and end thereof. Similarly, a fourth terminal 250 extends through an opening 251 in the first side wall 202 and into the lower chamber 209, the fourth terminal 250 having a third fixed contact 255 at the inner end theerof.

A fifth terminal 260, substantially identical in configuration to the second terminal 230, extends through an opening 261 in the second side wall 203 into the lower chamber 209. The fifth terminal 260 includes the bifurcated upstanding leg portions 263, and a second movable contact 265 is pivotally associated with the upstanding portions 263 of the fifth terminal 260 for pivotal movement between positions of engagement with the second fixed contact 245 and the third fixed contact 255. A second spring 267 extends between the fifth terminal 260 and the second movable contact 265, with the axis of the second spring 267 lying on one side or the other of the plane of the second movable contact 265, whereby the second movable contact 265 has two oppositely facing positions of stability with respect to the second fixed contact 245 and the third fixed contact 255, as shown in FIGS. 8 and 9.

A first actuator 270 extends through an opening 271 in the top wall 204 of the housing 201 and into the upper chamber 208, the outer end 272 of the first actuator 270 extending upwardly above the housing 201 for contact by an associated pressure applying member such as the upper arm 177 carried by the float stem 173. The first actuator has a "rest" position, a first depressed position, and a second depressed position in relation to the housing 201 as determined by the position of the arm 177 in response to downward movement of the float. The first actuator 270 has an aperture 273 therethrough, and the first spring 237 extends through the aperture 273, whereby the first actuator 270 is adapted to engage the spring 237 and effect movement thereof in a direction substantially normal to the axis of the spring. The first spring 237 and the first actuator 270 are arranged such that the spring normally biases the first actuator to the "rest" position thereof. The first actuator 270 is movable to its first depressed position in response to a first predetermined pressure being applied to the outer end thereof by the arm 177 of the float. As the first actuator 270 is moved downwardly to its first depressed position, it effects downward movement of the first spring 237 which causes the movable contact 235 to move to a position of engagement with the first fixed contact 225, as shown by the dashed lines in FIG. 8. As the pressure is released from the upper end of the first actuator 270, the first spring 237 causes the first actuator 270 to return to its rest position and also effects return movement of the first movable contact 235 to its normal position.

A second actuator 280 extends through an opening 281 in the bottom wall 205 and into the lower chamber 209. The second actuator 280 is in axial alignment with the first actuator 270.

The outer end 282 of the second actuator 280 extends beyond the bottom wall 205 of the housing 201 for contact by an associated pressure applying member such as the lower arm 176 carried by the float stem 173. The second actuator 280 also has an aperture 283 therethrough, the second spring 267 extending through the aperture 283 whereby the second actuator 280 is adapted to engage the second spring 283 and effect movement thereof in a direction substantially normal to the axis of the spring 267. The inner end 284 of the second actuator 280 extends through the opening 210 in the partition 207 and into the upper chamber 208, where it terminates substantially adjacent to the inner end 274 of the first actuator 270.

The second actuator 280 is movable between a first depressed position which corresponds to the position of the second movable contact 265 when it engages the second fixed contact 245 (FIG. 8), and a second depressed position which corresponds to the position of the second movable contact 265 when it engages the third fixed contact 255 (FIG. 9). In operation, movement of the first actuator 270 to the second depressed position thereof in response to a second predetermined pressure applied thereto causes the inner end 274 of the first actuator 270 to engage the inner end 284 of the second actuator 280 so as to effect axial movement of the second actuator 280 from its first depressed position to its second depressed position, whereby the second actuator 280 engages the second spring 267 and thereby causes the second movable contact 265 to move from its position of engagement with the second fixed contact 245 to its position of engagement with the third fixed contact 255.

The second actuator is movable in the opposite direction in response to a predetermined pressure being applied to the outer end 282 thereof, thereby to effect return movement of the movable contact 265 to its position of engagement with the second fixed contact 245.

The five terminals 220, 230, 240, 250 and 260 are connected in the electrical circuit of the machine in a manner to be described more fully hereinafter. Suffice it to say that as the water level in the supply tank 160 drops, the float 172 moves downwardly in response thereto, the float being movable from a "full" position wherein the supply tank is full and the supply valve 162 is closed, to a "demand" position wherein the water level drops to a first predetermined position in the supply tank, at which time the upper arm 177 engages the first fixed contact 225 to effect opening of the valve 162, thereby to admit water through the inlet 161 into the tank 160. As the water level rises upon opening of the valve 162, the pressure of the arm 177 on the first actuator 270 decreases until the first spring 237 causes the movable contact 235 to return to its normal position.

Should there be a defect in the machine or in the inlet valve which causes the water level in the tank 160 to drop to a much lower level, the float 172 will drop accordingly and will move to a second predetermined machine "cutoff" position, wherein the weight of the float 172 causes the upper arm 177 to exert a second predetermined pressure of greater magnitude on the first actuator 270, whereby the first actuator 270 engages the inner end of the second actuator 280 and effects movement thereof to its second depressed position and thereby causes the entire machine to shut down and also to effect opening of the valve 162.

As the water level rises in the supply tank, causing the float to rise therein from the machine "cutoff" position to the "demand" position, the lower arm 176 engages the outer end 282 of the second actuator 280 and effects movement thereof upwardly, whereby the second actuator 280 causes the second movable contact 265 to switch to its position of engagement with the second fixed contact 245, thereby to complete the circuit for the machine 20. Under normal operation, the float 172 will move only between the "full" position thereof and the "demand" position thereof in the tank.

The construction and operation of the improved instantaneous type carbonator 300 will now be described with special reference to FIGS. 3, 4, 12 and 13 of the drawings. The carbonator 300 comprises a fluid-tight vessel 301 including a cylindrical side wall 302 that is closed at the upper end thereof by an outwardly dished top wall 303 which is preferably drawn from the side wall 302. The lower end of the side wall 303 is closed by a bottom wall 305 that is free to move upwardly and downwardly within the side wall 302. The bottom wall 305 of the carbonator 300 is generally planar and has an annular channel 306 formed on the peripheral edge thereof, thereby to receive an O-ring 307. The O-ring 307 is partially disposed within the channel 306 and bears against the inner surface of the side wall 302 to seal the space between the side wall 302 and the bottom wall 305. The bottom wall 305 is normally limited in outward movement by a pair of pins 308 extending through openings in the side wall 302, the pins 308 engaging the bottom surface of the bottom wall 305.

In order to admit carbonating gas and water into the vessel 301, inlets therefor are formed in a unitary member or block 310 provided centrally of the top wall 303 and extending through an opening provided therein, the lower end of the block 310 having an outwardly directed flange 311 disposed beneath the top wall 303 and secured thereto as by brazing at 312. An O-ring 313 is disposed between the bottom of the block 310 and the top of the top wall 303. The block 310 has a first vertically disposed passage 314 therein extending between the interior of the vessel 301 and a first chamber 315 formed in the block 310. A second vertically disposed passage 316 is provided in the block 310 and extends between the interior of the vessel 301 and a second chamber 317 formed in the block 310.

There is received in the right hand end of the block 310 a first check fitting 320 having one end thereof in communication with the first chamber 315 formed in the block 310. The first check fitting 320 is secured to the block 310 by a spring clip 321; a cooperating O-ring 322 being interposed between the check fitting 320 and the block 310. The check fitting 320 has a passage 323 therethrough in communication with the chamber 315.

A water inlet pipe 325 in the beverage dispensing machine 20 is secured to the check fitting 320 by a coupling 326, the pipe 325 communicating with the passage 323 in the check fitting 320, thereby to admit water from the supply pipe 325 to the chamber 315 and thence through the first passage 314 and into the interior of the vessel 301. A check valve 327 including a closure member 328 and a coil spring 329 are disposed within the chamber 315. As shown in FIG. 12, the closure member 328 normally overlies the opening of the passage 323 leading into the chamber 315.

The left hand end of the block 310 carries a fitting 330 having one end thereof in communication with the second chamber 317 formed in the block 310. The fitting 330 is secured to the block 310 by a spring clip 331, and a cooperating O-ring 332 is interposed between the check fitting 330 and the block 310. The check fitting 330 has a passage 333 therethrough in communication with the chamber 317.

A gas inlet pipe 335 in the beverage dispensing machine 20 is secured to the outer end of the check fitting by way of a coupling 336, the interior of the pipe 335 connecting with the passage 333 in the check fitting 330 to admit carbonating gas, for example, carbon dioxide, first into the chamber 317 in the block 310 and then to the passage 316 and into the vessel 301.

The carbonator 300 includes a substantially centrally disposed baffle 340 that is generally circular in shape and has three rearwardly and outwardly extending arms 341 carrying downturned mounting flanges 342 thereon that are suitably secured as by welding to the side wall 302. The periphery of the baffle 340 accordingly is spaced from the inner surface of the side wall 302 to provide therebetween a passage 345. As viewed from the water inlet passage 313, the baffle 340 is shaped concave and further is formed and arranged so that the spray of water, diagrammatically shown at 346, entering from the passage 313 is directed upon the concave upper surface of the baffle 340, and upon forcefully striking the baffle 340 is broken up or atomized into individual droplets, diagrammatically illustrated as at 347, which droplets 347 are directed generally upwardly and outwardly toward the top wall 303 and the side wall 302, the water generally falling in a thin film through the passage 345 and downwardly to the lower end of the vessel 301, where it is collected in a pool as at 348.

The carbonated water collected as at 348 at the bottom of the vessel 301 is fed therefrom through an outlet valve generally designated by the numeral 350. The outlet valve 350 includes a casing 351 which extends upwardly into a threaded opening in the bottom wall 305, the upper end of the casing being threaded as at 352 for securement to the bottom wall. An O-ring is disposed between the casing 351 and the bottom wall 305 for sealing purposes. The upper end of the casing 351 extends slightly above the top of the bottom wall 305 of the vessel 301. Formed in the casing 351 is a vertical cylindrical opening 354 providing a vertical passage therethrough, a valve seat 355 being provided at the inner terminal end of the casing 351 for cooperation with a closure member designated generally as 360. A discharge conduit 358 is secured to the lower end of the casing 351 by a coupling 359.

The closure member 360 includes a body or plug 361 that is essentially cylindrical in cross section and is shaped and arranged to closely overlie that portion of the vertical passage 354 disposed within the valve seat 355, the plug or body 361 normally seating upon the valve seat 355 substantially to seal the passage 354 therein. The plug 361 is preferably formed of a relatively hard rubber material having a high resistance to water absorption and abrasion. The plug 361 is carried in the lower end of a poppet 362, the poppet 362 having a vertical passage 363 therein to relieve the build up of pressure when the plug is forced into the lower end of the poppet. The outer surface of the poppet is generally cylindrical and the upper end thereof is threaded as at 364.

The closure member 360 is adapted to operate in response to the amount of carbonated water disposed adjacent the bottom of the vessel 301 by way of a float 365 and a lever arm 370; the lever arm 370 being connected at one end thereof to the float and carrying the closure member 360 in the manner hereinafter described.

The lever arm 370 comprises a laterally extending central portion 371 having a pair of downwardly directed side flanges 372 thereon. The lever arm 370 is pivotally connected to the top surface of the bottom wall 305 adjacent to the valve casing 351, and is disposed centrally outward with respect thereto. The lever arm 370 is mounted on a pivot bracket 373 which comprises a generally horizontal center portion 374 and a pair of upstanding end flanges 375 which are parallel to the downwardly extending side flanges 372 of the lever arm. The pivot bracket 373 is secured to the bottom wall 305 by a pair of screws 376. A pivot means 377 interconnects the respectively adjacent flanges 372 and 375 of the lever arm and pivot bracket respectively. The poppet 362 of the closure member 360 is threaded into a cap 378 which is rigidly carried by the central portion 371 of the lever arm 370. A nylon insert 379 is interposed between the upper end of the poppet 362 and the cap 378 to keep the poppet in proper adjustment. The opposite end of the lever arm 370 is connected to the float 365, the float having a cylindrical cross section 366 and having an upper domed section 367 and a lower domed section 368. A depending member 369 extends from the lower domed section 368 into the lever arm 370 for cooperation therewith. It will be understood that the float 365 is formed fluid tight and is constructed so that it will float upon the carbonated water collected as at 348 when a suitable amount of carbonated water is collected therein.

In a typical construction of the carbonator 300, the side wall 302, the top wall 303, the bottom wall 305, the baffle 340, the valve casing 351 and the block 310 are all formed of stainless steel, which renders operation of the carbonator extremely sanitary, it further being pointed out that the provision of the pins 308 to hold the bottom wall 305 in place permits the bottom wall 305 and the portions mounted thereon to be removed quickly for ready cleaning of the interior of the carbonator 300.

During operation of the carbonator 300, the carbon dioxide gas is maintained at a pressure of approximately 70 p.s.i. within the vessel 301 and the water is injected thereinto at a pressure of 25 p.s.i. above the pressure of the carbon dioxide within the vessel 301, i.e., a pressure of 95 p.s.i. The water is pumped into the carbonator at a rate of 1⅛ ozs. per second, the amount of retained carbonated water as at 348 being approximately 20 cc., and a typical charge of water to be carbonated being 6¾ ozs., whereby the water to be carbonated flows through the carbonator 300 at a relatively high rate and is not present therein for any substantial period of time.

As water is pumped into the carbonator 300, the stream of water entering through the passage 314 is broken up into droplets as at 347 upon striking the baffle 340, and the droplets fall downwardly through the passage 345 as a film along the inner surface of the side wall 302 and to the bottom portion of the vessel 301.

After a small accumulation of carbonated water is collected in a pool in the lower end of the vessel, the float 365 will rise and thereby cause the lever arm 370 to pivot in the clockwise direction as shown in the drawings, whereby to raise the plug 361 from its position upon the valve seat 355 and to substantially instantaneously initiate the dispensing of carbonated water from the pool as it is collected, there being about a two second delay from the time the cold water is injected into the vessel 301 until the carbonated water begins to flow through the outlet valve.

It will be appreciated that the lifting movement of the float 365 and the opening of the outlet valve 350 is facilitated by the use of the lever arm 370, which greatly reduces the upward component of force which must be applied to the float before the valve will be opened. As shown in FIG. 12, the float 365 is positioned slightly off-center with respect to the vessel 301 so that the effective moment arm of the float is at a maximum. When the pumping of cold water into the carbonator 300 ceases, the continued flow of the carbonated water from the lower end of the vessel 301 will eventually permit the float 365 to return to the position illustrated in FIG. 12, thereby to place the closure member 360 upon the valve seat 355 to close the outlet passage 354.

In a typical construction of the carbonator 300, the vessel 301 has an internal diameter of 1⅞", an overall length of 7", the baffle 340 has a diameter of 1¾" and is positioned about 2" below the top wall 303, the float 365 has a diameter of 1⅝" and an overall height of 2¼", the float is positioned off-center by approximately ⅙₆", and the length of he lever arm 370 is approximately 1", the moment arm of the float being approximately 0.81" and the moment arm of the valve being approximately 0.156". From the foregoing it will be seen that the moment arm of the float is about five times as long as the moment arm of the valve, whereby it will be appreciated that the force required to lift the closure member 360 is approximately ⅕ of the force which would be required to raise the closure member if it were axially disposed with respect to the float.

The carbonator 300 works more efficiently if it and the contents thereof are chilled, and to this end a copper sleeve 380 is provided within which is placed the carbonator 300 and specifically the vessel 301 thereof, the copper sleeve 380 fitting closely about the stainless steel outer wall 302 to provide for good thermal transfer therebetween. In addition, a pair of brackets 385 is provided to interconnect the sleeve 380 and the tube 101 forming a part of the ice making mechanism, the brackets 385 each including a first semi-cylindrical portion 386 extending half-way around the adjacent end of the sleeve 380 and secured thereto as by brazing, a second semi-cylindrical portion 387 extending half-way around the adjacent end of the tube 101 and secured thereto as by brazing, and a strap 388 interconnected to the semi-cylindrical portions 386 and 387, all to provide good heat transfer and thermal contact between the tube 101 and the sleeve 380.

As shown in FIGS. 12 and 14, the discharge conduit 358 leading from the carbonator 300 is operatively connected to an improved carbonated water dispensing nozzle 400, which nozzle 400 is adapted to minimize agitation and foaming when the pressurized carbonated water is dispensed to atmospheric pressure. The dispensing nozzle 400 is preferably disposed at the dispensing station 31 of the machine 20; however, the dispensing nozzle 400 also may be suitably connected directly to the outlet of the carbonator 300.

The dispensing nozzle 400 comprises an elongated body 410 having a generally cylindrical outer surface 411. The upper end of the body 410 is threaded as at 412, whereby the discharge conduit 358 may be interconnected thereto by way of the coupling 413 as shown in FIG. 12. First and second annular grooves 414 and 415 are provided in the outer surface 411 of the body 410, and are disposed respectively adjacent to the opposite ends thereof. As shown in FIGS. 12 and 14, the first and second grooves 414 and 415 are adapted respectively to receive a pair of sealing O-rings 416 and 417, for reasons hereinafter explained.

The body 410 is provided with a centrally disposed and axially extending inlet opening 420 in one end thereof for receiving the pressurized carbonated water from the discharge conduit 358. The opposite end of the body is provided with a centrally disposed and axially extending outlet opening 430 for dispensing the carbonated water to atmospheric pressure at the dispensing station. A plurality of conduits 440 is provided in the body 410, the conduits extending radially outward from the inlet opening 410 to the outer surface 411 of the body. The plurality of conduits 440 terminate in the third annular groove 441 provided in the cylindrical outer surface 411 of the body 410. A plurality of ducts 450 is provided in the body 410, the ducts 450 extending radially outwardly from the inner end of the outlet opening 430 to the outer surface 411 of the body, where they terminate at a fourth annular groove 451 provided in the outer surface of the body 410.

A tubular sleeve 460 is disposed over the outer surface of the body and extends slightly beyond the first and second grooves 414 and 415 therein. After the O-rings 416 and 417 are snapped into position, the sleeve is inserted over the body 410, thereby firmly to hold the sleeve 460 in a centered position relative to the body 410. The inner wall of the sleeve 460 is only slightly spaced from the outer surface 411 of the body 410, whereby the inner wall and outer surface define an annular restriction passage 470 therebetween extending between the third annular groove 441 and the fourth annular groove 451, whereby carbonated water flowing into the inlet opening 420 from the discharge conduit 358 is directed outwardly through the plurality of conduits 440 into the third annular groove 441 and then into the restriction passage 470, through the restriction passage 470 to the fourth annular groove 451, and thence into the plurality of ducts 450 toward the outlet opening 430 for the dispensing thereof.

The restriction passage 470 serves to limit the size of the bubbles of the entrained carbonating gas in the carbonated water to a predetermined size as the pressure of the carbonated water is substantially dissipated during passage through the dispensing nozzle, whereby the amount of agitation and foaming caused by the release of the bubbles of carbonating gas from the dispensed carbonated water is minimized.

In a preferred construction of the dispensing nozzle 400, the body 410 has an overall length of about 1.2332 inches, the length between the closest edges of the first and second grooves being approximately .50 inch, the body has a nominal diameter of .6177± .0005 inch, the sleeve has an inner diameter of .6253± .0002 inch, the outlet opening 430 is approximately 0.375 inch in diameter, the conduits 440 are approximately .078 inch in diameter, the ducts 450 are approximately .47 inch in diameter, and the inlet opening 420 has a diameter of approximately .078 inch. From the foregoing it will be seen that the annular restriction passage 470 is of uniform radial extent, and the radial extent of the restriction passage is from .00345 inch to about .00415 inch. It will also be noted that the restriction passage 470 is of greater cross sectional area than the cross sectional area of the inlet passage 420, whereby the pressure of the carbonated water is substantially reduced as it flows from the inlet passage 420 and conduits 440 through the restriction passage 470. It will also be understood that the O-rings 416 and 417, in addition to preventing axial movement of the tubular sleeve 460, also serve to center the tubular sleeve and to seal the outer ends of the restriction passages 470, thereby to prevent leakage of carbonated water therefrom.

Figure 16:
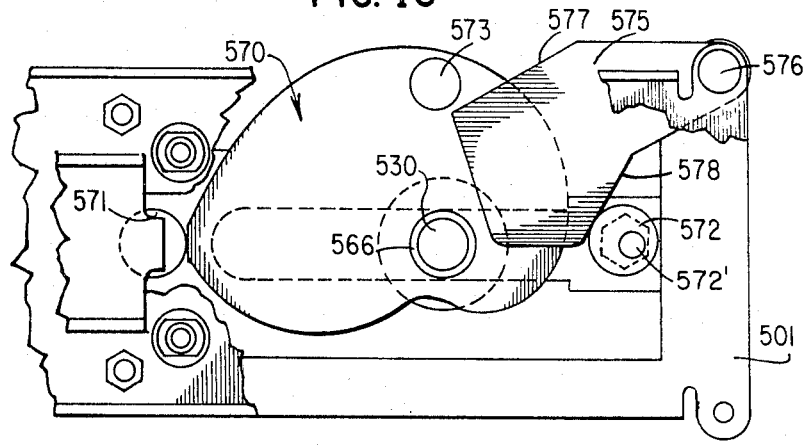
FIG. 16 is a view in vertical section along the line 16—16 of FIG. 15.

Referring now to FIGS. 15, 16 and 19 of the drawings, the pumping system 500 forming a part of the machine 20 will be described in detail, the pumping system 500 pumping both the water and flavor syrups to be dispensed into the cup 35. Referring first to FIG. 15, the pumping system 500 includes a frame comprising a pair of end plates 501 and 502 that are generally rectangular in shape and are disposed parallel to each other and a pair of opposed and spaced apart side plates 504. Each of the side plates 504 has a pair of longitudinally extending flanges 505 on the top and bottom thereof and a pair of laterally extending end flanges 506 on the ends thereof, the end plates 501 and 502 and the associated end flanges 506 having aligned openings therethrough receiving screws 507 fixedly to interconnect the end plates 501 and 502 with the side plates 504. A pair of inner frame plates 509 is also provided, each of the frame plates 509 being substantially rectangular in shape and having flanges extending outwardly to connect with the flanges 505 on the side plates 504.

As illustrated, four metering pumps have been shown mounted upon the frame, all four metering pumps being substantially identical in construction, whereby like reference numerals have been applied to like parts of the pumps with the addition of the suffixes A, B, C, and D, the four metering pumps being designated 510A, 510B, 510C and 510D, respectively, the following detailed description of the four metering pumps being confined to the description of the metering pump 510A, it being understood that the other three are of identical construction. The metering pump 510A includes a pump housing 511A that is generally cylindrical in shape and contains therein a movable flexible diaphragm (not shown) which is held in position by a plurality of bolts 512A passing through a flange 513A about the periphery of the housing 511A. An inlet valve 515A is provided for the pump 510A having an outwardly projecting connection 516A adapted to be connected to a supply of syrup designated 518A (see FIG. 21 also). An outlet valve 520A is also provided for the pump 510A, the outlet valve 520A having a connection 521A connected to a syrup outlet line 522A (see FIG. 21 also). A piston is provided within the pump 510A connected to the diaphragm therein and operable when moved to the right as illustrated in FIG. 15 to draw syrup through the inlet valve 515A into the pump 510A and operative when moved toward the left in FIG. 15 to force syrup under pressure through the outlet valve 520A and thence to the supply line 322A. A bolt 514A is provided in the rear wall and extends into the pump housing 511A and is adapted to engage the side of the diaphragm on the intake stroke of the piston, thereby to limit inward movement thereof so that only a carefully predetermined amount of syrup will be drawn into the pump 510A. The bolt 514A may be adjusted by rotation thereof to vary the amount of syrup to be dispensed from the pump 510A.

The piston (not shown) for causing operation of the pump 510A is connected to an actuating arm 525A which is pivotal and spring biased to the position illustrated in FIG. 15 and also carries on the outer end thereof a cam roller 526A. In order to drive the arm 525A, a shaft 530 is provided journaled in the end plates 501 and 502 and disposed substantially midway between the side plates 504, the shaft 530 having the upper end thereof as illustrated in FIG. 15 connected to a gear reducing mechanism 531 that in turn is driven by a motor 532. Mounted upon the shaft 530 are two opposed pairs of driving cams 533 and 534 for engaging the cam rollers 526A, for example, and 526D, for example, respectively, thereby to impart the driving motion of the rotating shaft 530 to the actuating arms 525A and 525D for the pumps 510A and 510D, respectively. The driving cams 533 and 534 are shaped to provide a full cycle of reciprocation of the connected piston of the associated pump for each cycle of revolution of the drive shaft 530.

In order to provide to drive connection between the actuating arm 525A, for example, and the cam 533, the arm 525A must be swung upwardly to place the roller 526A thereof in alignment with the cam 533, such movement of the actuatng arm 525A being controlled by a solenoid 540A. More specifically, the actuating arm 525A is continually urged downwardly by means of a spring (not shown) toward a position in engagement with the cam 533, the solenoid 540A having an arm (not shown) normally holding the actuating arm 525A out of engagement with the cam 533. In a typical cycle of operation of the syrup pumping portion of the pumping system 500, the normally de-energized motor 532 is energized and one of the normally de-energized solenoids, such as the solenoid 540A, is also energized, thereby releasing the actuating arm 525A for movement into engagement with the drive cam 533 and to cause one revolution of the drive shaft 530, thus to cause one intake and exhaust motion of the pump 510A. This serves to move a carefully predetermined quantity of syrup from the source 518A through the pump 510A to the output line 522A, after which all of the parts are de-energized and returned to the positions illustrated in FIGS. 15 and 21. Further details of the construction and operation of the syrup pumping portion of the pumping system 500 are disclosed in the copending application for U.S. Letters Patent Ser. No. 476,421, filed Aug. 2, 1965, by Donald S. Reynolds and Harvey R. Krueger for Metering Pump and System, now Patent No. 3,363,571 issued Jan. 16, 1968.

Also forming a part of the pumping system 500 is a water pump generally designated by the numeral 550, the water pump 550 being mounted upon the same frame and driven by the same drive shaft 530 as the syrup pump described above. More specifically, the water pump 550 includes a cylindrical housing 551 forming a cylinder and having an annular flange 552 which is adapted to be secured to a corresponding annular flange 553 provided on the spaced plates 501 by means of the bolts 554. The outer or left hand end of the cylinder 551, as viewed in FIG. 15, is provided with a head 555. Mounted in the head 555 is an intake valve 556 communicating between an input connector 557 and the interior of the cylinder 551. Also mounted in the head 555 is an outlet port 558 and an output connection 559 therefor. The head 555 is further provided with a high pressure safety valve illustrated generally as 560, which is operable to provide an over pressure relief outlet for water disposed within the cylinder 551.

Mounted within the cylinder 551 is a piston head 561 including the usual sealing construction. The piston head has a rearwardly directed piston link 562 thereon; a piston link pin 563 pivotally securing the piston link 562 to a pair of rearwardly directed parallel arms 565, which arms are journaled for reciprocating movement horizontally as viewed in FIGS. 15 and 16.

By connecting the piston head 561 to the arms 565 through the piston link pin 563, the piston head 561 is free to float within the cylinder 551 to compensate for any misalignment of the mechanism. A pair of axially spaced apart rollers 566 are positioned along the drive shaft 530 for rolling contact with the arms 565.

In order to move the piston 561 to cause the pump 550 to operate, a special shaped cam 570 is fixedly mounted upon the drive shaft 530 to be driven thereby, the shape of the cam 570 being best seen in FIG. 16 of the drawings. In order to cause the cam 570 to drive the piston 561, the arms 565 carry a pair of rollers 571 and 572 which engage the cam 570 to give positive control of the movement of the piston 561. The cam 570 also carries a stud 573 mounted thereon for engagement with an arm 575 for use in causing a quick intake stroke for the pump 550, the arm 575 being pivoted as at 576 to the frame and having a first cam surface 577 engageable with the stud 573 and a second cam surface 578 engageable with the rear or righthand roller 572 as viewed in FIGS. 15 and 16. The parts as illustrated in FIGS. 15 and 16 are shown at the beginning of the intake cycle with the piston 561 to the extreme lefthand position thereof. During the first portion of the revolution of the drive shaft 530, a very rapid intake stroke is accomplished by means of the cam 570 in cooperation with the stud 573 driving the arm 575 against the rear roller 572, after which a constant volume discharge stroke is provided so that a predetermined quantity of water is discharged from the pump 550 at a constant steady rate during all of the discharge portion of the operating cycle thereof. Also, as best seen in FIG. 16, the shaft for positioning the roller 572 is eccentrically disposed, whereby the intake stroke of the piston can be varied so that the machine can be adjusted to dispense drinks having greater or lesser quantities of water therein.

Figure 17:
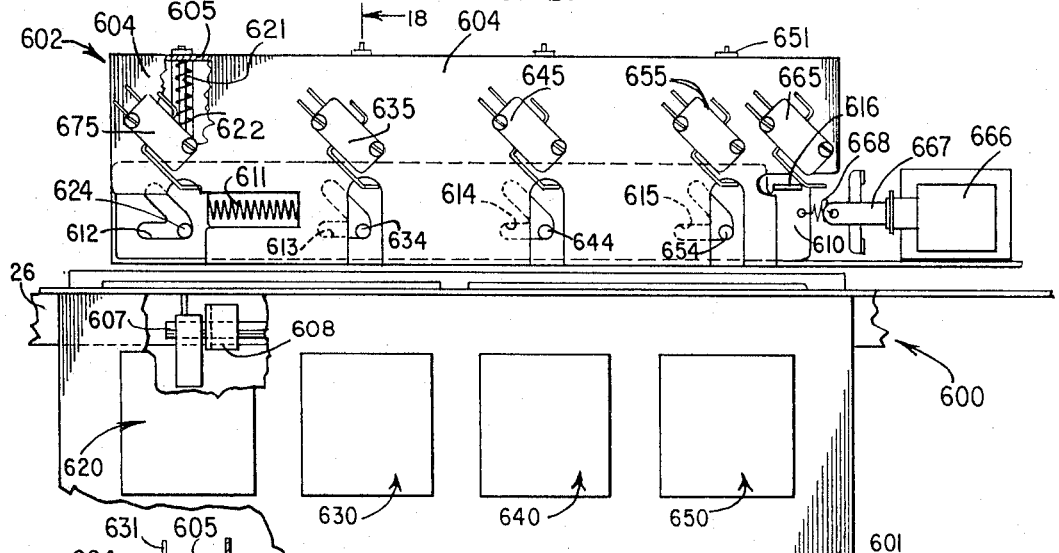
FIG. 17 is a rear elevational view of the push button control selector mechanism forming part of the present invention.
Figure 18:
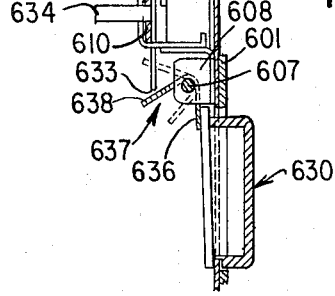
FIG. 18 is a view in vertical section along the line 18—18 of FIG. 17.

In order to select the flavor and character of the beverage to be dispensed by the machine 20, the push button selector mechanism 600 has been provided, the construction and operation of which are best illustrated in FIGS. 17, 18 and 21 of the drawings. The selector mechanism 600 includes a face plate 601 which is rigidly secured to the front wall 26 of the beverage dispensing machine 20. The face plate 601 is provided with four openings therein, in which four different selector buttons are provided as follows: a first flavored non-carbonated drink selector 620; a first flavored carbonated drink selector 630; a second flavored carbonated drink selector 640; and a third flavored carbonated drink selector 650. A housing 602 for mounting other members of the selector mechanism 600 is mounted upon the inner side of the front wall 26 of the upper housing 25. The housing 602 is comprised of a front frame 603, a rear frame 604, an upper wall 605 and a lower wall 606, the upper and lower walls of the housing 602 being provided by corresponding flanges on the front and rear frames.

An elongated slide bar 610 is mounted on the rear frame 604 of the housing for reciprocating movement between first and second positions relative thereto, the slide bar 610 moving in a lateral direction as viewed in FIG. 17 and a vertical direction as viewed in FIG. 21. A spring 611 is disposed between the slide bar 610 and the housing 602 for normally biasing the slide bar to the left as viewed in FIG. 17. The slide bar 610 is movable to a second position, to the right as viewed in FIG. 17, upon the actuation of a selected one of the various push buttons. For example, in a typical bush button 630, a shaft 631 is journaled in the housing 602 of the mechanism. A spring 632 is secured at one end thereof to the shaft 631 and the opposite end thereof bears against the upper wall 605 of the housing so as to urge the outer end 633 of the shaft 631 to its outermost position. The shaft 631 is adapted to be moved to a depressed position upon depression of the corresponding push button 630 in a manner shortly to be explained. The shaft 631 has a pin 634 extending upwardly through an associated slot 613 in the slide bar 610, the pin 634 engaging and actuating an associated control switch 635 when the shaft 631 is moved to its depressed position. The opening 613 in the slide bar has a configuration such that movement of the pin 634 therein in response to movement of the shaft 631 to its depressed position effects movement of the slide bar 610 to its second position (to the right in FIG. 17). Also, the configuration of each of the openings in the slide bar 610 is such that upon movement of the slide bar 610 to the second position thereof, the slide bar 610 prevents depression of the remainder of the shafts of the other push buttons.

As best seen in FIG. 18, a laterally extending rod 607 is positioned on the inner surface of the front wall 26 by a plurality of brackets 608 (one only being shown), the rod 607 being disposed below the lower wall 606 of the housing 602, one end of the push button 630 to pivot inwardly with respect to the face plate 601. The inner surface of the push button 630 is disposed for engagement with a first leg 636 of a dog leg spring 637 which is pivotally mounted on the rod 607. When the push button 630 is depressed, the rear surface thereof engages the first leg 636 of the spring 637 and causes rotation of the spring 637 so that the second leg 638 thereof engages the outer end 633 of the shaft 631 and effects movement of the shaft 631 to its depressed position relative to the housing 602.

It will be understood that each of the push button mechanisms 620, 630, 640 and 650 are constructed and operate in a like manner to effect movement of the slide bar to the right, except that: the mechanism 620 operates an associated switch 625, and also operates a second stacked switch 675 positioned immediately thereabove; the selector 640 operates an associated switch 645; and the selector 650 operates an associated switch 655.

Movement of the slide bar 610 to the right causes a cam surface 616 carried thereby also to move to the right, the cam surface 616 serving to operate a switch 665 which ultimately serves to energize a holding relay 666. The holding relay 666 is connected to the slide bar 610 and is operative to hold the slide bar 610 in the right hand or actuated position thereof, the armature 607 thereof being connected by means of a spring 608 to the slide bar 610.

Before describing the electrical connections for the machine 20, it is necessary at this point to described the remaining elements of the carbonated and non-carbonated water dispensing systems and the operation thereof. The elements of the water systems are best illustrated in FIG. 19 of the drawings, wherein it is seen that one outlet from the water supply tank 160 is connected to the supply line 115 for supplying water to the bottom of the ice cube making apparatus 100. The second outlet supplies water to the water pump 550 and specifically to the supply line 185 therefor that supplies water to the inlet check valve 556 of the pump. The water from the pump 550 passes through an outlet check valve 186 and enters an output line 187 that connects with an input to the cooling coil 190 disposed about the ice storage hopper 130. The conduit 325 connects the outlet of the cooling coil 190 to the inlet check valve 327 for the carbonator 300. A second conduit 191 also is connected to the cooling coil outlet, the opposite end of the conduit 191 being connected to an electrically operated dispensing valve 195. The dispensing valve 195 has an outlet 196 at the dispensing station whereby non-carbonated water can be dispensed therefrom. Thus, it will be seen that water from the outlet of the cooling coil 190 can pass either to the first conduit 325 of the second conduit 191. The water pump 550 is operative to establish a first predetermined pressure at the cooling coil outlet, and the flow of water either to the carbonator or through the dispensing valve 195 is effectively controlled by the single dispensing valve 195. When the dispensing valve 195 remains closed, the pressure of the water against the inlet check valve 327 in the carbonator is sufficient to cause the check valve to open so that the cooled water flows into the carbonator for passage therethrough in the manner heretofore described. If the dispensing valve 195 is open when the water pump operates, the pressure at the outlet of the cooling coil 190 is substantially lower than the predetermined pressure required to effect opening of the check valve 327, whereby the water in the cooling coil 190 flows through the conduit 191, the dispensing valve 195 and the outlet 196 therefrom at the dispensing station. It will thus be appreciated that the single dispensing valve 195 is effective to control the dispensing of both non-carbonated and carbonated water from the machine. There also is illustrated in FIG. 19 the connection to the carbonator 300 of a source of carbon dioxide gas such as the high pressure container 390 having the usual controls 391 and a relief valve 392 and connected by the pipe 335 to the carbon dioxide inlet in the block 310 of the carbonator 300.

Figure 20:
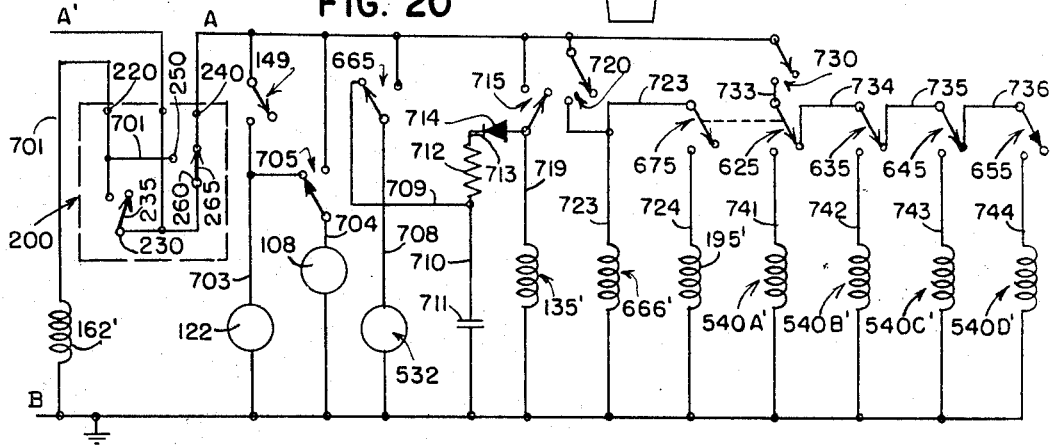
FIG. 20 is a schematic and diagrammatic view of the electrical circuit for the machine of FIG. 1.

There are illustrated in FIG. 20 of the drawings certain of the electrical connections for the principal parts of the machine 20, the input to the electrical circuit of FIG. 20 being on a pair of line conductors designated A' and B and connected through suitable fuses and switches (not shown) to a suitable 118 volt, 60-cycle A.C. supply. As illustrated in FIGS. 6 and 20, the conductor A' is connected to the fifth terminal 260 of the water level control switch 200, the third terminal 240 of the switch 200 being connected to the main conductor A, whereby when the movable contact 265 of the switch 200 engages the fixed contact 245 of the switch (FIG. 8) the conductors A' and A are electrically connected. The conductor A' is also connected to the second terminal 230 of the switch 200. A conductor 701 interconnects the first terminal 220 and one terminal of the solenoid coil 162' for the valve 162, the opposite terminal of the solenoid coil being connected to the conductor B. A branch of the conductor 701 also is connected to the fourth terminal 250 of the switch 200. In operation, when the water supply tank is full, the movable contact 235, as heretofore described, provides a normally open circuit between the conductors A' and 701; also, the second movable contact 265 engages the fixed contact 245 so as to provide a complete circuit between the conductor A', the switch 200 and the conductor A, thereby to provide electrical power to the machine 20. As the water supply is depleted, the float will move to the "demand" position thereof, which movement effects closing of the first movable contact 235 so as to complete a circuit through the conductor 701 and the coil 162; opening the valve 162 and thereby causing additional water to be admitted to the supply tank 160 until the first movable contact returns to its normal position as illustrated in FIGS. 8 and 20. If the water level in the tank 160 reaches a dangerously low level, then the second movable contact 267 of the switch disengages from the fixed contact 245, thereby to interrupt all electrical power to the machine 20, and engages the third fixed contact 255 so as to complete a circuit through the conductor 701 and the coil 162; thereby causing additional water to be admitted to the chamber 160 until the second movable contact 267 of the switch returns to its normal position as illustrated in FIGS. 8 and 20, at which time electrical power is again supplied to the main conductor A.

It further will be seen that the conductor B is connected to one of the input terminals of the compressor motor 122 and to one of the input terminals to the ice making motor 108 and to one terminal of the pump motor 532 to supply electrical potentials thereto. The other terminal of the compressor motor 122 is connected by a conductor 703 to the normally closed ice level switch 149 (see FIG. 2 also) which in turn connects to the main conductor A, so that the compressor motor 122 is operated so long as there is a demand for ice in the storage hopper 130, i.e., so long as the storage hopper 130 is not completely filled so as to open the switch 149 by ice pressing against the diaphragm 147. The other terminal of the ice maker motor 108 is connected by a conductor 704 to a switch 705 which when in the left-hand position illustrated in FIG. 20 connects through the conductor 703 and the switch 149 to the main conductor A so that the auger 105 driven by the motor 108 operates so long as there is a demand for ice in the storage hopper 130. The switch 705 has a second position to the right wherein it is connected directly to the conductor A, the switch 705 being a cam operated switch mounted adjacent to the lower end of the main drive shaft 530 (see FIGS. 7 and 21 also), the cam 706 for operating the switch 705 being driven by the shaft 530, the switch 705 being more particularly operated by a cam follower 707 engaging the periphery of the cam 706 during the major portion of the time that the water and syrup pump drive motor 532 is operating. The other terminal of the pump motor 532 is connected by a conductor 708 through the switch 665 on the control mechanism (see FIGS. 20 and 21 also) to the main conductor A, whereby the pump motor 532 is operated each time that a push button control switch is operated to effect movement of the slide bar 610 so as to close the switch 665. The switch 665 has a second position to the left, wherein it is connected to a conductor 709, the conductor 709 being connected to branch conductor 710, the conductor 710 being connected to one terminal of a capacitor 711, and the other terminal of the capacitor 711 being connected to the conductor B. The conductor 710 is also connected to one terminal of a resistor 712, the opposite terminal of the resistor being connected to a conductor 713, which in turn is connected to one terminal of a solid state rectifier 714. The opposite terminal of the rectifier 714 is connected to one terminal of a second cam operated switch 715, the opposite terminal of the switch 715 being connected to the conductor A. The switch 715 is more particularly controlled by a cam 716 mounted on the pump shaft 530 and having associated therewith a cam follower 717 that engages the switch 715 to cause closure thereof for the desired predetermined portion of a dispensing cycle. A conductor 716 is connected to the switch 715 and to one terminal of a solenoid coil 135' for controlling the opening of the door 135 for the ice hopper 130 for dispensing of ice into the cup 35, the other terminal of the solenoid coil 135' being connected to the conductor B.

When the switch 715 is closed for a particular cycle as determined by the configuration of the cam 716, the capacitor 711 is charged with rectified current flowing through the rectifier 714, the conductor 713, the resistor 712 and the conductor 710. When the switch 715 opens, the capacitor 711 cannot discharge through the coil 135' to the conductor B because of the rectifier 714. When the switch 665 opens at the end of the cycle, in the manner heretofore described, it moves to its second position (to the left as shown in FIG. 20) for contact with the conductor 709, at which time the capacitor 711 discharges through the conductor 710, the conductor 709, the switch 665 and the conductor 708 through the windings of the motor 532, whereby the capacitor 711 operates to effect dynamic braking of the pump motor 532.

The conductor A connects to a cycle switch 720 that is another cam operated switch on the pump drive shaft 530 (see FIGS. 15 and 21 also). More specifically, the switch 720 is controlled by a cycle cam 721 fixedly mounted on the drive shaft 530 and contacted by a cam follower 722 that serves to operate the switch 720, the switch 720 being closed during substantially the full cycle of operation of the motor 532. The other contact of the cycle switch 720 is connected to a conductor 723 which is in turn connected to one terminal of the coil 666' for the lock solenoid 666 the other terminal of the coil 666' being connected to the main conductor B.

In the operation of the machine 20, the switch 665 is closed by the cam surface 616 of the slide bar when the user selects a drink and depresses one of the push buttons, the switch 665 being closed long enough to energize the pump motor 532 for a sufficient period of time to close the cycle switch 720, the lock solenoid coil 665' being energized so that the slide bar 610 serves to hold the switch 665 in the closed position until the pump motor 532 has turned the drive shaft 530 through a complete revolution, after which the cycle switch 720 is opened deenergizing the lock solenoid coil 666', whereupon the spring 611 causes the slide bar 610 to return to its normal position which causes the switch 665 to open, thus deenergizing the pump drive motor 532.

The conductor 723 is also connected to one terminal of the switch 675, the other terminal of the switch 675 being connected to one terminal of the solenoid coil 195' of the non-carbonated water dispensing valve 195, the other terminal of the coil 195' being connected to the conductor B. A fourth cam operated switch 730 is provided having one terminal thereof connected to the main conductor A and having the other terminal thereof connected to a conductor 733, the switch 730 being a syrup pulse switch that is controlled by a cam 731 fixedly mounted on the drive shaft 530 and having a cooperating cam follower 732 thereon that actuates the syrup pulse switch 730. Each of the four syrup pump solenoids 540A, 540B, 540C and 540D has a corresponding solenoid coil 540'A, 540'B, 540'C and 540'D having one terminal thereof connected to the conductor B and the other terminal thereof respectively connected to the associated push button actuated control switches 625, 635 and 645 and 655, through the conductors 741 through 744 respectively. One terminal of the switch 625 is connected to the conductor 733 for connection with the cam operated switch 730, the other terminal of the switch 625 being connected by the conductor 734 to the switch 635, the switch 635 being connected by a conductor 735 to the switch 645, the switch 645 being connected by a conductor 736 to the switch 655, and the switch 655 in turn being connected to the main conductor B.

Figure 5:
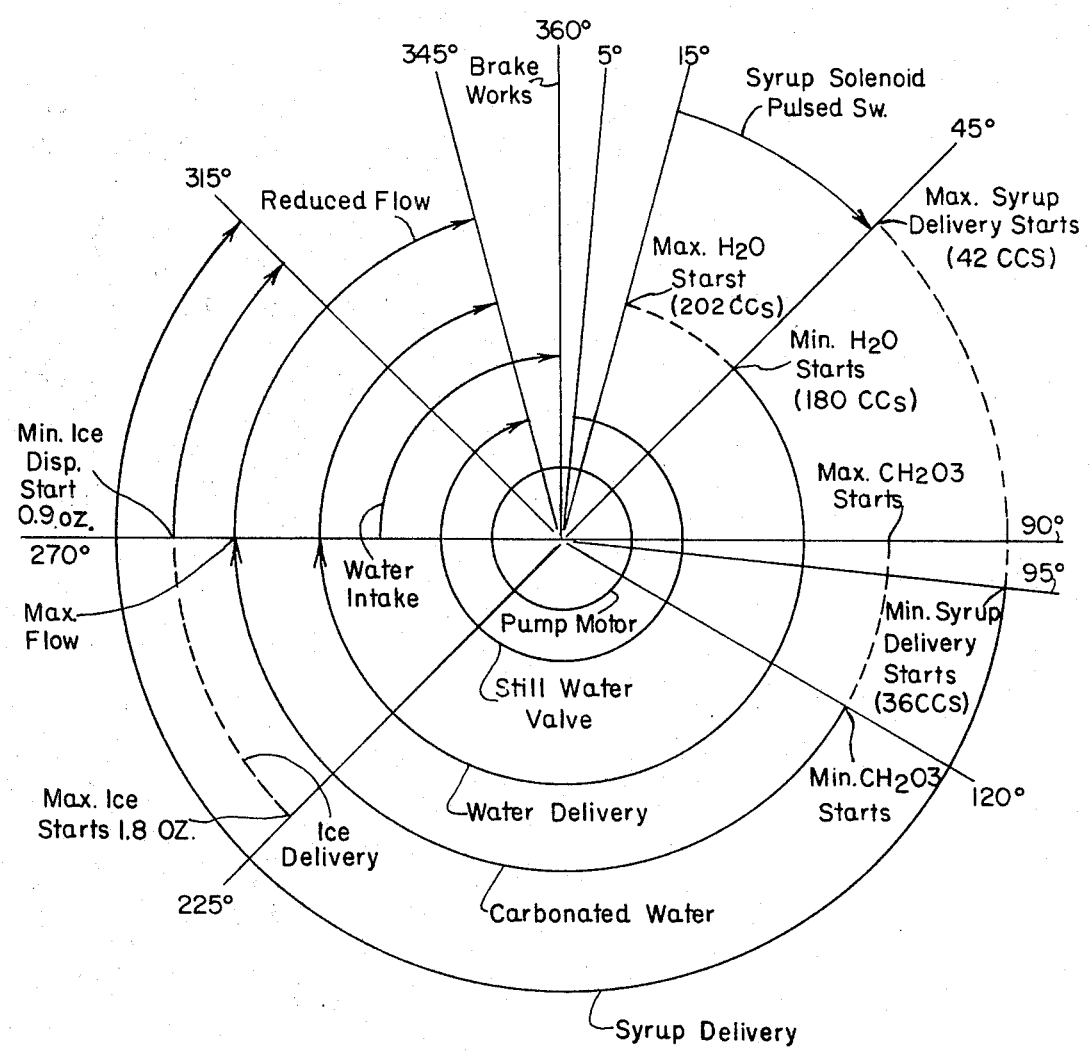
FIG. 5 is a diagram illustrating two typical cycles of operation of the machine of FIGS. 1 and 2.

Referring now to FIG. 5 of the drawings, there is shown two typical cycle diagrams for the machine 20, illustrating the time that different events occur and different parts are actuated after the beginning of a dispensing cycle. The full lines in FIG. 5 indicate a first cycle of the machine when the machine has been adjusted to dispense a drink of smaller quantity, whereas the extended dashed lines in FIG. 5 indicate a cycle wherein the machine has been adjusted to dispense a drink of greater quantity. As previously noted, the machine may be adjusted to dispense drinks of different quantities by adjusting the stroke of the piston 561 in the water pump 550, and also adjusting the stroke of the diaphragm in the syrup pump.

Assuming that a non-carbonated and ice drink of smaller quantity is to be dispensed, such as by pushing the selector button 620 in FIG. 17, the pump motor 532 is first actuated. At the 5° point, the non-carbonated water dispensing valve 195 is opened and remains open through the 345° point in the cycle of operation. At the 45° point of the diagram the water pump 550 begins to deliver water at a constant rate and continues to do so from the 45° point to the 270° point in the cycle, at which time the water pump begins the intake stroke thereof. At the 270° point therefore the water flow rate is reduced until the dispensing valve 195 is closed at the 345° point, thereby positively to stop further delivery of the non-carbonated water. At the 15° point in the cycle, the syrup pulse switch 730 is closed and remains closed for 30°, whereby syrup delivery is commenced at the 95° point and continues through the 315° point in the cycle. At the 270° point, the ice dispensing door 135 is opened to dispense ice into the container 35, this being the final ingredient in three component drink comprising non-carbonated water, flavored syrup and ice. If, on the other hand, carbonated water is to be used in place of non-carbonated water, the non-carbonated water dispensing valve 195 remains closed for the full cycle of the machine, whereby carbonated water is dispensed commencing at the 120° point in the cycle of operation. The carbonated water delivery may, dependent on the flow rate of the dispensing nozzle, extend beyond the machine cycle until the float operated valve in the carbonator closes. The cycle for a drink of larger quantity is similar to that heretofore described, but the beginning points of operation are advanced as shown by the dashed lines in FIG. 5.

Referring now to FIG. 21 of the drawings, there is shown a schematic representation of the entire dispensing machine including all of the interconnections of the several parts thereof, the following being a description of the complete operation of the machine 20 with particular reference to FIG. 21. In preparation for operation of the machine 20, water must be connected thereto through the supply line 163 (see FIG. 19 also), the electrical connections must be made thereto on the conductors A' and B (see FIG. 20 also) and a source of carbon dioxide gas such as the cylinder 390 must be connected as illustrated in FIG. 19; it further is assumed that the ice making apparatus 100 is operated for a sufficient period of time to provide a quantity of ice cubes in the storage hopper 130 and to cool the several syrup coils 150A, 150B, 150C and 150D and to cool the water coil 190 and to cool the vessel 301 of the carbonator 300 to the desired low operating temperature thereof.

Assuming now that the user desires to obtain from the machine 20 a carbonated drink with ice, he pushes any one of the push buttons 630, 640 and 650, depending upon the flavor he desires, and for the purpose of description of a first dispensing cycle, it will be assumed that the user has operated the push button 630. Operation of the push button 630 serves to move the slide bar 610 downwardly as viewed in FIG. 21, the pin 634 engaging the associated slot 613 in the bar 610.

Movement of the bar 610 first actuates the push button locking switch 665 by contact with the cam surface 618, whereby to establish an electrical circuit from the conductor A through the switch 665 and through the conductor 708 to one terminal of the motor 532, the other terminal of the motor 532 being connected to the other conductor B. The motor 532 accordingly begins to operate and turns the shaft 530 and all of the cams mounted thereon including the cam 721 which controls the cycle switch 720, the cycle switch 720 being closed immediately after initiation of the operation of the motor 532. Closure of the cycle switch 720 serves to energize the lock solenoid 666, whereby to hold the slide bar 610 in the actuated position thereof, the parts being held in this position until one revolution of the drive shaft 530 at which time the cycle switch 720 is opened.

Such inward movement of the push button 630 also causes the pin 634 to close the control switch 635, the locking of the slide bar 610 in the actuated position likewise locking the switch 635 closed until such time as the holding solenoid 666 is de-energized. As soon as the pump motor 532 has caused the shaft 530 to rotate 45°, the water pump 550 begins the discharge cycle thereof and discharges water through the pipe 187 and thence into the cooling coil 190 about the ice hopper 130, the water being cooled in passing through the coil 190. After leaving the cooling coil 190, the water flows through the conduit 325 so that it enters the carbonator 300 through the check valve 327, the water being carbonated as has been described more fully hereinabove, it merely being pointed out here that the water is substantially instantaneously carbonated in passing through the vessel 301, an accumulation of the carbonated water in the lower end of the vessel 301 quickly opening the discharge valve 350 at the lower end thereof at about the 120° point in the cycle, whereby the carbonated water in the discharge pipe 358 from the carbonator 300 can flow through the dispensing nozzle 400 and into the cup 35 in position beneath the discharge therefrom.

The syrup pulse switch 730 is closed for a 30° sector of rotation of the shaft 530 after the shaft 530 has rotated 15°, thereby to energize the associated control solenoid 540B so as to place the cam follower 526B in driving contact with the cam 533, the parts being held in this position during the entire syrup delivery time even though the syrup pulse switch 730 is shortly thereafter opened, all this taking place because switch 635 has been closed by actuation of the push button 630 and held in the closed position by the action of the lock solenoid 666 holding the slide bar 610 in the actuated position thereof. Since the associated syrup pump 510B is now operating, syrup is delivered and delivery of the syrup is continued through the 315° rotation point of the control shaft 530 (see FIG. 5 also). The syrup is moved from the supply source 518B thereof through the pump 510B and the discharge pipe 522B and through the associated cooling coil 150B disposed about the tube 101, and specifically the refrigerating coil 116 thereof, to be cooled thereby after which the syrup is discharged through the discharge line 151B into the cup 35 disposed in alignment therebelow.

Both water and syrup are now flowing into the cup 35, and after 270° rotation of the control shaft 530, the ice dispensing switch 715 is closed, this completing a circuit for the ice dispensing solenoid 135' which opens the discharge door 135 in the ice storage hopper 130, ice being dispensed into the cup 35 therebelow until the control shaft 530 reaches approximately the 315° point, at which time the switch 715 is opened to de-energize the solenoid 135' which causes closure of the door 135 on the ice storage hopper. At the same time that the ice dispensing solenoid 135' is energized, the capacitor 711 is charged with rectified current. When the dispensing switch 715 is opened, the capacitor retains its charge until the switch 665 moves to its second position.

At the 270° point in the operation of the control shaft 530, the water delivery pump 350 begins its water intake stroke, the syrup delivery stops at the 315° point, and finally at the 360° point the cycle switch 720 opens to end the dispensing cycle. Opening of the cycle switch 720 de-energizes the lock solenoid 666 thus permitting the slide bar 610 to be returned by the spring 611 thereof into the return position thereof, thus returning all of the parts to the normal position illustrated in FIG. 21. At this time the switch 665 completes a circuit from the charged capacitor 711 through the conductors 710, 709 and 708 into the windings of the pump motor 532, which charge tends to cause the motor to rotate in the opposite direction and thereby positively brakes the motor 532 so that only exact predetermined charges of water and syrup are dispensed. The parts of the machine are now in position to initiate a second dispensing operation.

Assuming now that a non-carbonated drink is desired in a second beverage dispensing cycle, the user simply pushes push button 620 rather than the push button 630. This causes movement of the upper slide bar 610 to the right as viewed in FIG. 17 and downwardly as viewed in FIG. 21 to cause the cam surface 616 to engage the switch 665, and also the pin 624 to engage and operate the switch 625 controlling the syrup solenoid 540B and the switch 675 for controlling the dispensing valve 195. All of the resultant action heretofore described is then repeated with the exception of the opening of the non-carbonated dispensing valve 195. As a result, the non-carbonated water valve 195 is opened after 5° rotation of the control shaft 530 (see FIG. 5), whereby as soon as the water pump 530 begins to discharge at the 45° point, water is forced through the cooling coil 190 and then through the conduit 191 to the now open valve 195 and from the valve 195 through a discharge conduit 196 into the waiting cup 35. Discharge of the still or noncarbonated water continues through the 345° point of rotation of the control shaft 530. In all other respects, the second illustrative dispensing cycle is the same as the first illustrative dispensing cycle, whereby there is delivered to the cup 35 still or non-carbonated water, a measured quantity of the desired syrup from the supply source 518A and a measured quantity of ice cubes from the ice storage hopper 130.

It further is pointed out that other illustrative dispensing cycles like the first dispensing cycle above can be produced by pushing the push buttons 640 or 650 in place of the push button 630, whereby to repeat the first illustrative dispensing cycle with the exception of substituting a different flavored syrup by actuating a different one of the control solenoids 540C or 540D, as the case may be, for controlling the appropriate syrup pump. If it becomes desirable to dispense more than one non-carbonated drink, the machine may easily be modified by stacking a second switch above the selected one of the switches 635, 645, or 655, and placing the switch in circuit with the solenoid valve 195.

From the above, it will be seen that there has been provided a beverage dispensing machine that can provide a variety of drinks including non-carbonated and carbonated drinks, in any one of four selected flavors. There has been provided an improved non-carbonated and carbonated water dispensing system wherein a single electrically operated valve is used to effect the dispensing of either carbonated or non-carbonated water from the machine. There has also been provided an improved float operated electrical switch for controlling operation of the beverage dispensing machine. There also has been provided an improved carbonated water dispensing nozzle which minimizes the amount of agitation and foaming of the carbonated water when it is dispensed to atmospheric pressure. Finally, an improved push button selector system and dynamic electrical braking system have been provided for use in the improved beverage dispensing machine disclosed herein.

While there has been described what is at present considered to be the preferred embodiment of the invention, it will be understood that various modifications may be

What is claimed is:

1. In a beverage dispensing machine, the combination comprising a housing having a dispensing station thereon for accommodating a container for a beverage, a cooling coil in said housing for cooling water passing therethrough and having an inlet and an outlet, a water pump in said housing and having an inlet connected to a source of water and an outlet connected to the inlet of said cooling coil, said water pump being operative to establish a first predetermined pressure at said cooling coil outlet, a fluid-tight vessel disposed in said housing and defining a carbonating chamber, a first inlet in said vessel for admitting water under pressure to said carbonating chamber and a second inlet in said vessel for admitting gas under pressure to said carbonating chamber, a source of carbonating gas for supplying carbonating gas to said second vessel inlet, an outlet in said vessel for delivering carbonated water from said carbonating chamber, a dispensing valve having an outlet at said dispensing station for discharging cooled non-carbonated water at said dispensing station, a first conduit connecting said cooling coil outlet and said first vessel inlet for passing cooled water from said cooling coil into said carbonating chamber, a second conduit connecting said cooling coil and said dispensing valve, a normally closed check valve disposed in said first conduit, said check valve being operable to admit water under pressure into said carbonating chamber when the pressure of the water thereagainst is at a second predetermined pressure less than said first predetermined pressure, a third conduit having one end connected to said vessel outlet and the other end thereof at said dispensing station, and control mechanism selectively operable to cause operation of said water pump and to maintain said dispensing valve closed whereby operation of said pump causes water to flow through said cooling coil and to the outlet thereof at a pressure greater than said second predetermined pressure so as to effect flow through said first conduit and to effect opening of said check valve for passage therethrough of cooled water into said carbonating chamber and thence through said third conduit for discharge at said dispensing station, said control mechanism being selectively operable to cause operation of said water pump and to maintain said dispensing valve open whereby operation of said pump causes water to flow through said cooling coil and to the outlet thereof at a pressure lower than said second predetermined pressure so as to effect flow through said second conduit and said dispensing valve for passage therethrough of cooled water and for discharge at said dispensing station.

2. The combination set forth in claim 1, and further comprising flow control means disposed at said dispensing station for minimizing foaming of the carbonated water upon the dispensing thereof, said flow control means comprising an elongated body having an inlet connected to said third conduit for admitting pressurized carbonated water thereto and an outlet at said dispensing station for dispensing carbonated water at atmospheric pressure therefrom, said body having an elongated restriction passage therein extending between said inlet and outlet and through which the carbonated water flows, said restriction passage serving to limit the size of the bubbles of the entrained carbonating gas in the carbonated water to a predetermined size as the pressure of the carbonated water is substantially dissipated during passage through said restriction passage, whereby the amount of agitation and foaming caused by the release of the bubbles of carbonating gas from the dispensed carbonated water is minimized.

3. The combination set forth in claim 1, and further comprising a drive motor for said water pump, and a dynamic electrical braking circuit forming a part of said control circuit and operative at the end of a predetermined time interval to apply a braking potential to said drive motor, thereby positively to stop said drive motor and thus to cause said water pump to dispense an exact predetermined amount of water at said dispensing station.

4. The combination set forth in claim 3, and further comprising a syrup pump mounted in said housing and having an inlet adapted to be connected to a source of flavored syrup and having an outlet communicating with said dispensing station, said drive motor also being effective to operate said syrup pump, whereby said dynamic electrical braking circuit is effective positively to stop said drive motor and thus to cause said syrup pump to dispense an exact predetermined amount of syrup at said dispensing station.

5. The combination set forth in claim 1, wherein said vessel constitutes a carbonator that is of the instantaneous type adapted substantially instantaneously to carbonate water injected therein through said first vessel inlet.

6. The combination set forth in claim 1, wherein said vessel is generally upstanding and has an inner wall defining a generally upstanding carbonating chamber, the upper portion of said carbonating chamber having a carbonating gas atmosphere therein provided by said source of carbonating gas and the lower portion of said carbonating chamber containing a predetermined quantity of carbonated water, said vessel further comprising a baffle mounted therein and having at least a portion of the periphery thereof spaced from the inner wall of said vessel to provide a passageway therebetween, the cooled water under pressure when injected into said carbonating chamber forcefully striking said baffle and being broken into droplets by impact therewith and directed upwardly thereby through the carbonating gas atmosphere and thence against said inner wall and flowing downwardly through said passage to the lower end portion of said carbonating chamber, and a float actuated valve in said vessel outlet responsive to the level of carbonated water in said vessel below said baffle, whereby the injection of water into said carbonating chamber by said pump effects a substantially instantaneous carbonation of the water and the dispensing of the carbonated water through said vessel outlet and said third conduit to said dispensing station.

7. The combination set forth in claim 1, wherein said water pump is of the positive displacement type adapted to eject a predetermined quantity of water through the outlet thereof.

8. In a beverage dispensing machine, the combination comprising a housing having a dispensing station thereon for accommodating a container for a beverage, ice making apparatus in said housing and including an ice storage hopper, a cooling coil in said housing for cooling water passing therethrough and having an inlet and an outlet, said cooling coil being in thermal contact with said ice storage hopper whereby the ice in said ice storage hopper cools the water flowing through said cooling coil, a water pump in said housing and having an inlet connected to a source of water and an outlet connected to the inlet of said cooling coil, said water pump being operative to establish a first predetermined pressure at said cooling coil outlet, a fluid-tight vessel disposed in said housing and defining a carbonating chamber, a first inlet in said vessel for admitting water under pressure to said carbonating chamber and a second inlet in said vessel for admitting gas under pressure to said carbonating chamber, a source of carbonating gas for supply carbonating gas to said second vessel inlet, an outlet in said vessel for delivering carbonated water from said carbonating chamber, a dispensing valve having an outlet at said dispensing station for discharging cooled non-carbonated water at said dispensing station, a first conduit connecting said cooling coil outlet and said first vessel inlet for passing cooled water from said cooling coil into said carbonating chamber, a second conduit connecting said cooling coil and said dispensing valve, a normally closed check valve disposed in said first conduit, said check valve being operable to admit water under pressure into said carbonating chamber when the pressure of the water thereagainst is at a second predetermined pressure less than said first predetermined pressure, a third conduit having one end connected to said vessel outlet and the other end thereof at said dispensing station, and control mechanism selectively operable to cause operation of said water pump and to maintain said dispensing valve closed whereby operation of said pump causes water to flow through said cooling coil and to the outlet thereof at a pressure greater than said second predetermined pressure so as to effect flow through said first conduit and to effect opening of said check valve for passage therethrough of cooled water into said carbonating chamber and thence through said third conduit for discharge at said dispensing station, said control mechanism being selectively operable to cause operation of said water pump and to maintain said dispensing valve open whereby operation of said pump causes water to flow through said cooling coil and to the outlet thereof at a pressure lower than said second predetermined pressure so as to effect flow through said second conduit and said dispensing valve for passage therethrough of cooled water and for discharge at said dispensing station.

9. In an iced beverage dispensing machine, the combination comprising a housing having a dispensing station thereon for accommodating a container for a beverage, ice making apparatus in said housing and including an upstanding tube having an inner wall and an outer wall, said inner wall defining an upstanding cylindrical freezing chamber having an outlet at the upper end thereof, an inlet for supplying water to said freezing chamber, means for cooling said tube to freeze water in said freezing chamber, means for removing ice from said freezing chamber and for delivering the ice to said outlet, an ice storage hopper mounted above said freezing chamber and in communication with said oulet, drive mechanism for operating said ice removing means to force the ice from said freezing chamber through said outlet and into said ice storage hopper for storage therein, a cooling coil in said housing for cooling water passing therethrough and having an inlet and an outlet, said cooling coil being wrapped around and supported by and in thermal contact with the outer wall of said ice storage hopper whereby the ice in said ice storage hopper cools the water flowing through said cooling coil, a water pump in said housing having an inlet connected to a source of water and an outlet connected to the inlet of said cooling coil, said water pump being operative to establish a first predetermined pressure at said cooling coil outlet, a fluid-tight vessel disposed in said housing and defining a carbonating chamber, a first inlet in said vessel for admitting water under pressure to said carbonating chamber and a second inlet in said vessel for admitting gas under pressure in said carbonating chamber, a source of carbonating gas for supplying carbonating gas to said second vessel inlet, an outlet in said vessel for delivering carbonated water from said carbonating chamber, a dispensing valve having an outlet at said dispensing station for discharging cooled non-carbonated water at said dispensing station, a first conduit connecting said cooling coil outlet and said first vessel inlet for passing cooled water from said cooling coil into said carbonating chamber, a second conduit connecting said cooling coil and said dispensing valve, a normally closed check valve disposed in said first conduit, said check valve being operable to admit water under pressure into said carbonating chamber when the pressure of water thereagainst is at a second predetermined pressure less than said first predetermined pressure, a third conduit having one end connected to said vessel outlet and the other end thereof at said dispensing station, and control mechanism selectively operable to cause operation of said water pump and to maintain said dispensing valve closed whereby operation of said pump causes water to flow through said cooling coil and to the outlet thereof at a pressure greater than said second predetermined pressure so as to effect flow through said first conduit and to effect opening of said check valve for passage therethrough of cooled water into said carbonating chamber and thence through said third conduit for discharging at said dispensing station, said control mechanism being selectively operable to cause operation of said water pump and to maintain said dispensing valve opening whereby operation of said pump causes water to flow through said cooling coil and to the outlet thereof at a pressure lower than said second predetermined pressure so as to effect flow through said second conduit and said dispensing valve for passage therethrough of cooled water and for discharge at said dispensing station.

10. The combination set forth in claim 9, and further comprising a discharge opening in said ice storage hopper communicating with said dispensing station, and a door for said discharge opening movable between a normally closed position and an open dispensing position, said control mechanism being operable to effect movement of said door to said open position thereof to dispense ice from said storage hopper to said dispensing station.

11. The combination set forth in claim 9, wherein said ice removing means comprises an upstanding auger disposed in said tube for scraping ice from said inner wall and for delivering the ice to the outlet.

12. The combination set forth in claim 9, wherein said vessel defining said carbonating chamber is in thermal contact with said tube.

13. The beverage dispensing machine set forth in claim 9, and further comprising a second cooling coil supported by and in thermal contact with the outer wall of said tube for cooling flavored syrup flowing through said second cooling coil, said second cooling coil having an inlet adapted to be connected to a source of flavored syrup and an outlet at said dispensing station, said control mechanism being selectively operable to dispense cold syrup at said dispensing station substantially simultaneously with the dispensing of said noncarbonated water or carbonated water.

14. In a beverage dispensing machine, the combination comprising a housing having a dispensing station thereon for accommodating a container for a beverage, a syrup pump mounted in said housing and having an inlet adapted to be connected to a source of flavored syrup and having an outlet communicating with said dispensing station, a water pump having an inlet adapted to be connected to a source of water and an outlet communicating with said dispensing station, a common drive motor for said syrup pump and said water pump, timer mechanism including a switch that is moved into the actuating position at the beginning of a dispensing operation and after a predetermined time interval is moved out of the actuating position to terminate the dispensing operation, a control circuit interconnecting a source of electrical power and said drive motor and said switch for applying electrical power to said drive motor at the beginning of a dispensing operation by movement of said switch to the actuating position thereof and for removing electrical power from said drive motor at the end of the dispensing operation, and a dynamic electrical braking circuit forming a part of said control circuit and operative at the end of said predetermined time interval to apply a braking potential to said drive motor thereby positively to stop said drive motor and thus to cause said syrup pump to dispense an exact predetermined amount of syrup at said dispensing station and thus to cause said water pump to dispense an exact predetermined amount of water at said dispensing station.

15. The combination set forth in claim 14, wherein said electric braking circuit is effective to apply an electrical potential to said motor tending to cause operation thereof in the reverse direction.

16. The combination set forth in claim 14, wherein said electric braking circuit includes a capacitor adapted to be charged during the dispensing operation and upon movement of said switch from its actuating position the output of said capacitor is applied across the drive motor to apply thereto a potential tending to reverse the direction of rotation of said drive motor.

17. In an iced beverage dispensing machine, the combination comprising a first housing having a dispensing station thereon for accommodating a container for a beverage, a plurality of electrically controlled dispensing means disposed in said first housing for respectively dispensing measured quantities of a corresponding plurality of flavored syrups, each of said dispensing means having an inlet adapted to be connected to a source of flavored syrup and each having an outlet in communication with said dispensing station, means for dispensing a measured quantity of carbonated water at said dispensing station, and a selector mechanism controlling said dispensing means for dispensing a selected drink containing a selected one of said flavor syrups and carbonated water, said selector mechanism including a second housing disposed in said first housing, an elongated slide bar carried on said second housing for reciprocating movement between first and second positions, a first spring normally biasing said slide bar toward said first position, a first switch mounted on said second housing and operable in response to movement of said slide bar to said second position, means operatively connected to said slide bar for applying a longitudinal force thereto in response to operation of said first switch for maintaining said slide bar in said second position, a plurality of shafts corresponding to the number of said dispensing means for dispensing flavored syrups mounted on said second housing for reciprocating movement between outer positions and depressed positions relative to said second housing, each of said shafts having a second spring associated therewith for normally biasing said shaft to said outer position, a corresponding plurality of push buttons carried by said housing and operable to effect movement of a corresponding one of said shafts to its depressed position, a corresponding plurality of second switches mounted on said housing, each of said second switches being responsive to depression of the corresponding one of said push buttons for effecting operation of a respective one of said electrically operated dispensing means for dispensing flavored syrup, said slide bar having a configuration such that depression of any one of said shafts effects movement of said slide bar from the first position to the second position thereof in which said slide bar locks the selected shaft in the depressed position and prevents depression of the remainder of said shafts, whereby operation of a selected one of said push buttons effects the depression of the corresponding one of said shafts and the operation of the corresponding one of said second switches so as to effect dispensing of a selected one of said flavored syrups and also effects movement of said slide bar to said second position and the closing of said first switch whereby said slide bar is held in said second position to prevent the consequent actuation of the remainder of said second switches.

18. The combination set forth in claim 17, wherein said means connected to said slide bar for applying a longitudinal force thereto comprises a holding relay energized in response to closing of said first switch.

19. The combination set forth in claim 18, and further comprising an electrically operated timing mechanism operative in response to closing of said first switch, and a timer controlled switch responsive to said timing mechanism and operative to effect de-energization of said relay whereby said first spring effects movement of said slide bar to said first position and the consequent de-energization of said timing mechanism.

20. The combination set forth in claim 17, and further comprising electrically controlled means for dispensing a measured quantity of non-carbonated water and having an inlet adapted to be connected to a source of non-carbonated water and an outlet in communication with said dispensing station, and a third switch carried by said second housing and operable in response to the depression of at least one of said shafts to effect the dispensing of non-carbonated water, whereby operation of the corresponding push button effects operation of said third switch for the dispensing of a drink containing the selected one of said flavoring ingredients and non-carbonated water.

21. A push-button selector mechanism comprising a housing, a first switch mounted on said housing and including a movable contact, an elongated slide bar carried by said housing for reciprocating movement between first and second positions, movement of said bar to said second position effecting actuation of said movable contact to close said first switch, a first spring normally biasing said slide bar toward said first position, a plurality of shafts mounted on said housing for reciprocating movement between outer positions and depressed positions relative to said housing, a corresponding plurality of push-buttons carried by said housing and operable to effect movement of a corresponding one of said shafts to its depressed position, each of said shafts having a second spring associated therewith for normally biasing said shaft to said outer position and each of said shafts having an actuating pin extending therefrom into the plane of said slide bar, a corresponding plurality of second switches mounted on said housing, each of said second switches having a movable contact disposed for actuation by a respective one of said actuating pins when the corresponding one of said shafts is depressed, a corresponding plurality of actuating recess means on said slide bar adapted respectively to receive a corresponding one of said actuating pins for moving said slide bar from said first position to said second position in response to depression of said shafts, each of said actuating recess means having a configuration such that upon movement of said slide bar to said second position in response to the depression of one of said shafts, said recess means cause said slide bar to retain said one shaft in said depressed position and prevent depression of the remainder of said shafts, and means operatively connected to said slide bar for applying a longitudinal force thereto in response to actuation of said first switch for maintaining said slide bar in said second position, whereby operation of a selected one of said push buttons effects depression of the corresponding one of said shafts and the closing of the corresponding one of said second switches and also effects movement of said slide bar to said second position and the closing of said first switch whereby said slide bar is held in said second position to prevent depression and consequent actuation of the remainder of said second switches.

22. In a beverage dispensing machine, the combination comprising a housing having a dispensing station thereon, a cooling coil in said housing for cooling water passing therethrough and having an inlet and an outlet, a water pump in said housing and having an inlet connected to a source of water and an outlet connected to the inlet of said cooling coil, said water pump being operative to establish a first predetermined pressure at said cooling coil outlet, a fluid-tight vessel disposed in said housing and defining a carbonating chamber, a first inlet in said vessel for admitting water under pressure to said carbonating chamber and a second inlet in said vessel for admitting gas under pressure to said carbonating chamber, a source of carbonating gas for supplying carbonating gas to said second vessel inlet, and outlet in said vessel for delivering carbonated water from said carbonating chamber, a first conduit connecting said cooling coil outlet and said first vessel inlet for passing cooled water from said cooling coil into said carbonating chamber, a normally closed check valve disposed in said first conduit, said check valve being operable to admit water under pressure into said carbonating chamber when the pressure of the water thereagainst is at a second predetermined pressure less than said first predetermined pressure, a second conduit having an inlet connected to said vessel outlet and an outlet, a dispensing nozzle disposed at said dispensing station for minimizing foaming of the carbonated water upon the dispensing thereof, said dispensing nozzle having an inlet connected to said second conduit for admitting carbonated water under pressure thereto and an outlet at said dispensing station for dispensing carbonated water at atmospheric pressure therefrom and having an elongated restriction passage therein extending between said inlet and outlet through which the carbonated water flows, said restriction passage serving to limit the size of the bubbles of the entrained carbonating gas in the carbonated water to a predetermined size as the pressure of the carbonated water is substantially dissipated during passage through said restriction passage, whereby the amount of agitation and foaming caused by the release of the bubbles of carbonating gas from the dispensed carbonated water is minimized, and control mechanism selectively operable to cause operation of said water pump whereby operation of said pump causes water to flow through said cooling coil and to the outlet thereof at a pressure greater than said second predetermined pressure so as to effect flow through said first conduit and to effect opening of said check valve and for passage therethrough of cooled water into said carbonating chamber and thence through said second conduit and the restriction passageway in said dispensing nozzle for discharge at said dispensing station.

23. The combination set forth in claim 22, wherein said dispensing nozzle comprises an elongated body having a generally cylindrical outer surface and having a centrally disposed and axially extending inlet in one end thereof and a centrally disposed and axially extending outlet in the other end thereof, a plurality of conduits extending radially outwardly from said inlet to the outer surface of said body, a plurality of ducts extending radially outwardly from said outlet to the outer surface of said body, and a tubular sleeve disposed over said body and having an inner wall only slightly spaced from the outer surface of said body whereby said inner wall and said outer surface define an annular restriction passage therebetween extending from said plurality of conduits to said plurality of ducts whereby carbonated water flowing into said inlet is directed outwardly through said plurality of conduits into said restriction passage, through said restriction passage, inwardly through said plurality of ducts toward said outlet and then dispensed from said body through said outlet.

References Cited

UNITED STATES PATENTS

| | | | |
|---|---|---|---|
| 2,750,076 | 6/1956 | Welty et al. | 222—129.1 |
| 2,612,304 | 9/1952 | Nissen | 222—129.4 |
| 2,850,213 | 9/1958 | Cole | 222—129.4 |
| 3,100,585 | 8/1963 | Nail et al. | 222—63 |
| 3,211,338 | 10/1965 | Weil et al. | 222—70 |

SAMUEL F. COLEMAN, *Primary Examiner.*

H. S. LANE, *Assistant Examiner.*

U.S. Cl. X.R.

62—137; 103—25; 200—16; 222—63, 129.4, 146, 333